(12) United States Patent
Jack et al.

(10) Patent No.: US 10,273,415 B2
(45) Date of Patent: Apr. 30, 2019

(54) FLEXIBLE OPTIONS FOR UTILIZING NAPHTHA FROM A LOW TEMPERATURE FISCHER-TROPSCH PROCESS IN A PLANT CONVERTING BIOMASS TO SYNCRUDE OR TRANSPORTATION FUELS

(71) Applicant: Sundrop Fuels, Inc., Longmont, CO (US)

(72) Inventors: Douglas S. Jack, Longmont, CO (US); Renus C. Kelfkens, Longmont, CO (US); Steve C. Lythgoe, Littleton, CO (US); Wayne W. Simmons, Longmont, CO (US)

(73) Assignee: Sundrop Fuels, Inc., Longmont, CO (US)

(*) Notice: Subject to any disclaimer, the term of this patent is extended or adjusted under 35 U.S.C. 154(b) by 0 days.

(21) Appl. No.: 15/947,024

(22) Filed: Apr. 6, 2018

(65) Prior Publication Data

US 2018/0291279 A1 Oct. 11, 2018

Related U.S. Application Data

(60) Provisional application No. 62/483,122, filed on Apr. 7, 2017.

(51) Int. Cl.
*C07C 1/00* (2006.01)
*C10G 1/00* (2006.01)
(Continued)

(52) U.S. Cl.
CPC ............. *C10G 2/344* (2013.01); *C01B 3/382* (2013.01); *C10G 3/00* (2013.01); *C10G 45/00* (2013.01); *C10J 3/466* (2013.01); *C10J 3/485* (2013.01); *C01B 2203/0233* (2013.01); *C01B 2203/062* (2013.01); *C10G 2300/1011* (2013.01); *C10G 2400/02* (2013.01); *C10G 2400/04* (2013.01); *C10G 2400/08* (2013.01); *C10J 2300/0916* (2013.01); *C10J 2300/0976* (2013.01);
(Continued)

(58) Field of Classification Search
CPC .................................. C07C 1/00; C10G 1/00
USPC .......................... 585/240, 241, 310; 208/49
See application file for complete search history.

(56) References Cited

U.S. PATENT DOCUMENTS 8,814,961 B2 8/2014 Perkins et al.
8,961,628 B2 2/2015 Ampulski et al.
(Continued)

FOREIGN PATENT DOCUMENTS

WO 2013148610 A1 10/2013
WO 2013158343 A1 10/2013
(Continued)

*Primary Examiner* — Thuan D Dang
(74) *Attorney, Agent, or Firm* — Rutan & Tucker, LLP

(57) ABSTRACT

A bio-reforming reactor receives biomass to generate chemical grade syngas for a coupled downstream train of a low-temperature Fischer-Tropsch reactor train that uses this syngas derived from the biomass in the bio-reforming reactor. A renewable carbon content of the produced gasoline, jet fuel, and/or diesel derived from the coupled downstream train the low-temperature Fischer-Tropsch reactor train are optimized for recovery of renewable carbon content to produce fuel products with 100% biogenic carbon content and/or fuel products with 50-100% biogenic carbon content. The low-temperature Fischer-Tropsch reactor train produces syncrude, transportation fuels such as bio-gasoline or bio-diesel, or a combination thereof.

20 Claims, 6 Drawing Sheets

(51) Int. Cl.
*C10G 2/00* (2006.01)
*C01B 3/38* (2006.01)
*C10G 3/00* (2006.01)
*C10G 45/00* (2006.01)
*C10J 3/48* (2006.01)
*C10J 3/46* (2006.01)

(52) U.S. Cl.
CPC ................. *C10J 2300/1659* (2013.01); *C10J 2300/1807* (2013.01); *Y02E 50/13* (2013.01); *Y02E 50/32* (2013.01); *Y02P 30/20* (2015.11)

(56) References Cited

U.S. PATENT DOCUMENTS

| | | |
|---|---|---|
| 9,011,560 B2 | 4/2015 | Simmons et al. |
| 9,126,173 B2 | 9/2015 | Ampulski et al. |
| 9,295,961 B2 | 3/2016 | Laska et al. |
| 9,416,077 B2 | 8/2016 | Kelfkens et al. |
| 9,447,326 B2 | 9/2016 | Ferraro et al. |
| 9,663,363 B2 | 5/2017 | Simmons et al. |
| 2013/0247448 A1 | 9/2013 | Ampulski et al. |
| 2013/0248760 A1 | 9/2013 | Ampulski et al. |
| 2014/0241949 A1 | 8/2014 | Perkins et al. |
| 2014/0341785 A1 | 11/2014 | Simmons et al. |
| 2016/0152905 A1 | 6/2016 | Kelfkens et al. |
| 2017/0066983 A1 | 3/2017 | Jack et al. |

FOREIGN PATENT DOCUMENTS

| | | |
|---|---|---|
| WO | 2013191897 A1 | 12/2013 |
| WO | 2014043552 A1 | 3/2014 |
| WO | 2014204519 A1 | 12/2014 |
| WO | 2016086141 A1 | 6/2016 |

FLEXIBLE OPTIONS FOR UTILIZING NAPHTHA FROM A LOW TEMPERATURE FISCHER-TROPSCH PROCESS IN A PLANT CONVERTING BIOMASS TO SYNCRUDE OR TRANSPORTATION FUELS

CROSS-REFERENCE

This application claims the benefit under 35 USC 119 of U.S. Provisional Patent Application No. 62/483,122, filed Apr. 7, 2017, titled "Flexible Options for Utilizing Naphtha from a Low Temperature Fischer-Tropsch Process in a Plant Converting Biomass to Syncrude or Transportation Fuels," which is hereby incorporated herein by reference in its entirety.

FIELD

The design generally relates to an integrated process plant having a biomass reforming reactor and a number of options for utilizing naphtha from a low-temperature Fischer-Tropsch ("LTFT") process.

BACKGROUND

Many economists plan for reducing global-warming emissions include different technologies to create, track, and measure an amount of renewable carbon in fuel sources. The renewable carbons in these fuels are a result of the biogenic content of the feedstocks used to create these fuels. The specific renewable (or biogenic) carbon content of these biofuels vary with the configuration of the production process.

SUMMARY

Systems and methods are discussed for an integrated process plant having a biomass reforming reactor and a number of options for utilizing naphtha from a LTFT process.

Disclosed herein is an integrated plant including, in some embodiments, an interconnected set of two or more stages of reactors forming a bio-reforming reactor configured to generate syngas for a LTFT reactor train. The syngas is derived from biomass including wood fed to the bio-reforming reactor. Any fuel products produced by the low-temperature Fischer-Tropsch reactor train have a biogenic content of between 50% and 100%. A first stage of the bio-reforming reactor includes a circulating fluidized bed reactor that has one or more media inputs to feed heat-absorbing media, a vessel to circulate the heat-absorbing media, and one or more biomass inputs to supply the biomass. The first stage is configured to cause a set of chemical reactions in the biomass to produce reaction products of constituent gases, tars, chars, and other components, which exit through a reactor output from the first stage. A second stage of the bio-reforming reactor has an input configured to receive a stream of some of the reaction products including the constituent gases and at least some of the tars as raw syngas. The second stage of the bio-reforming reactor is further configured to chemically react the raw syngas within a vessel of the second stage to yield a chemical grade syngas by further cracking the tars, excess methane, or both into constituent molecules. The chemical grade syngas is mixed with a natural gas-derived syngas from a steam methane reformer in order to form a mixed syngas that is supplied to a LTFT reactor train configured for a LTFT process. The integrated plant is configured with a number of recirculation loops such that any fuel products produced by the low-temperature Fischer-Tropsch reactor train have a biogenic content of between 50% and 100%. For example, the integrated plant may be configured with a first recirculation loop for recirculating at least $C_1$-$C_5$ products back to i) the steam methane reformer, ii) the second stage of the bio-reforming reactor, or iii) both, from the LTFT reactor train in order to aid in converting the biomass supplied to the first stage of the bio-reforming reactor to syncrude or transportation fuels through the LTFT process with a biogenic content of between 50% and 100%.

Also disclosed herein is a method for an integrated plant including, in some embodiments, producing syngas for a LTFT process from biomass fed to a bio-reforming reactor of an interconnected set of two or more stages of reactors that form the bio-reforming reactor. The integrated plant feeds biomass, including wood chips, to a circulating fluidized bed reactor of the first stage of the bio-reforming reactor through one or more biomass inputs of the circulating fluidized bed reactor. The integrated plant feeds heat-absorbing media into the circulating fluidized bed reactor through one or more media inputs and circulating the heat-absorbing media in a vessel of the circulating fluidized bed reactor. The integrated plant produces reaction products of constituent gases, tars, chars, and other components from a set of chemical reactions in the biomass in the first stage and subsequently sends the reaction products through a reactor output of the circulating fluidized bed reactor of the first stage. The integrated plant receives a stream of some of the reaction products including the constituent gases and at least some of the tars as raw syngas through an input of the second stage of the bio-reforming reactor. The integrated plant chemically reacts the raw syngas within a vessel of the second stage to yield a chemical grade syngas by further cracking the tars, excess methane, or both into constituent molecules. The integrated plant mixes the chemical grade syngas with a natural gas-derived syngas from a steam methane reformer to form a mixed syngas. The integrated plant sends the mixed syngas to a LTFT reactor train configured for a LTFT process. The integrated plant recirculates at least $C_1$-$C_5$ products back to the steam methane reformer and/or the second stage of the bio-reforming reactor from the LTFT reactor train through one or more recirculation loops in order to aid in converting the biomass supplied to the first stage of the bio-reforming reactor to syncrude or transportation fuels through the LTFT process.

BRIEF DESCRIPTION OF THE DRAWINGS

The multiple drawings refer to the example embodiments of the design.

Figure 1:
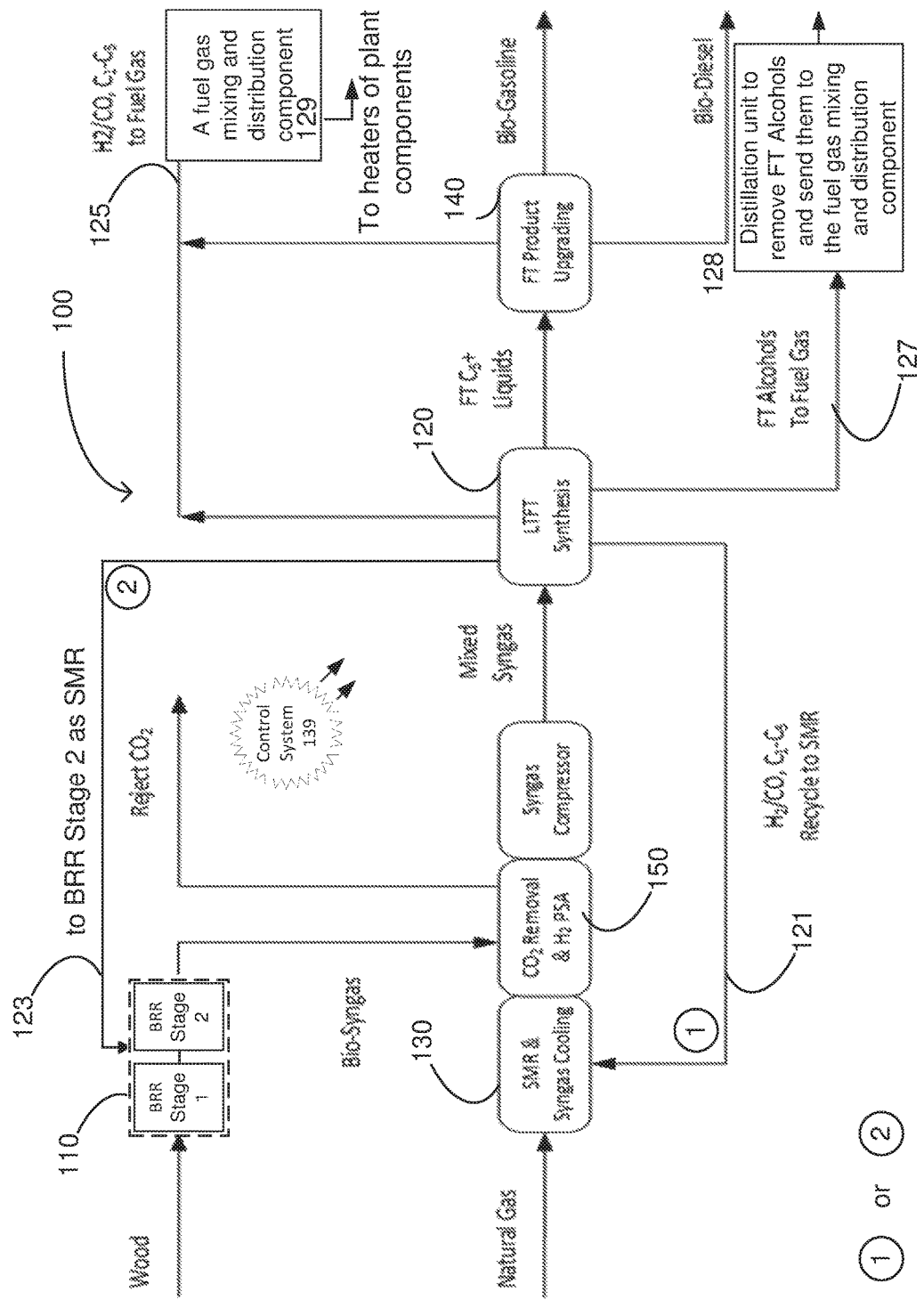
FIG. 1 illustrates a diagram of flexible options for utilizing Fischer-Tropsch products in an integrated plant using recycling loops for converting biomass into transportation fuels having a biogenic content of between 50% and 100% in accordance with some embodiments.

While the design is subject to various modifications and alternative forms, specific embodiments thereof have been shown through example in the drawings and will herein be described in detail. The design should be understood to not be limited to the particular forms disclosed, but on the contrary, the intention is to cover all modifications, equivalents, and alternatives falling within the spirit and scope of the design.

DETAILED DISCUSSION

In the following description, numerous specific details are set forth, such as examples of specific chemicals, named components, connections, types of heat sources, specific numeric values given for an example design, etc., in order to provide a thorough understanding of the present design. It will be apparent, however, to one skilled in the art that the present design may be practiced without these specific details. In other instances, well known components or methods have not been described in detail but rather in a block diagram in order to avoid unnecessarily obscuring the present design. Further, specific numeric references such as a first reactor, can be made. However, the specific numeric reference should not be interpreted as a literal sequential order but rather interpreted that the first reactor is different than a second reactor. Thus, the specific details set forth are merely exemplary. The specific details can be varied from and still be contemplated to be within the spirit and scope of the present design. The term coupled is defined as meaning connected either directly to the component or indirectly to the component through another component. Concepts discussed for a first embodiment may be implemented in another embodiment where that is logically possible.

In general, before describing any particular embodiments, an integrated plant for biomass conversion is disclosed that includes a bio-reforming reactor ("BRR") system consisting of two or more stages to generate syngas from biomass, a LTFT reactor train, or another chemical process that uses the reaction syngas product derived from the biomass in the bio-reforming reactor. Flexible options for utilizing naphtha (e.g., light naphtha such as $C_5$ and $C_6$ products, heavy naphtha such as $C_6$-$C_{12}$ products, or both) from a LTFT process in a plant converting biomass to syncrude or transportation fuels are also disclosed.

Figure 4:
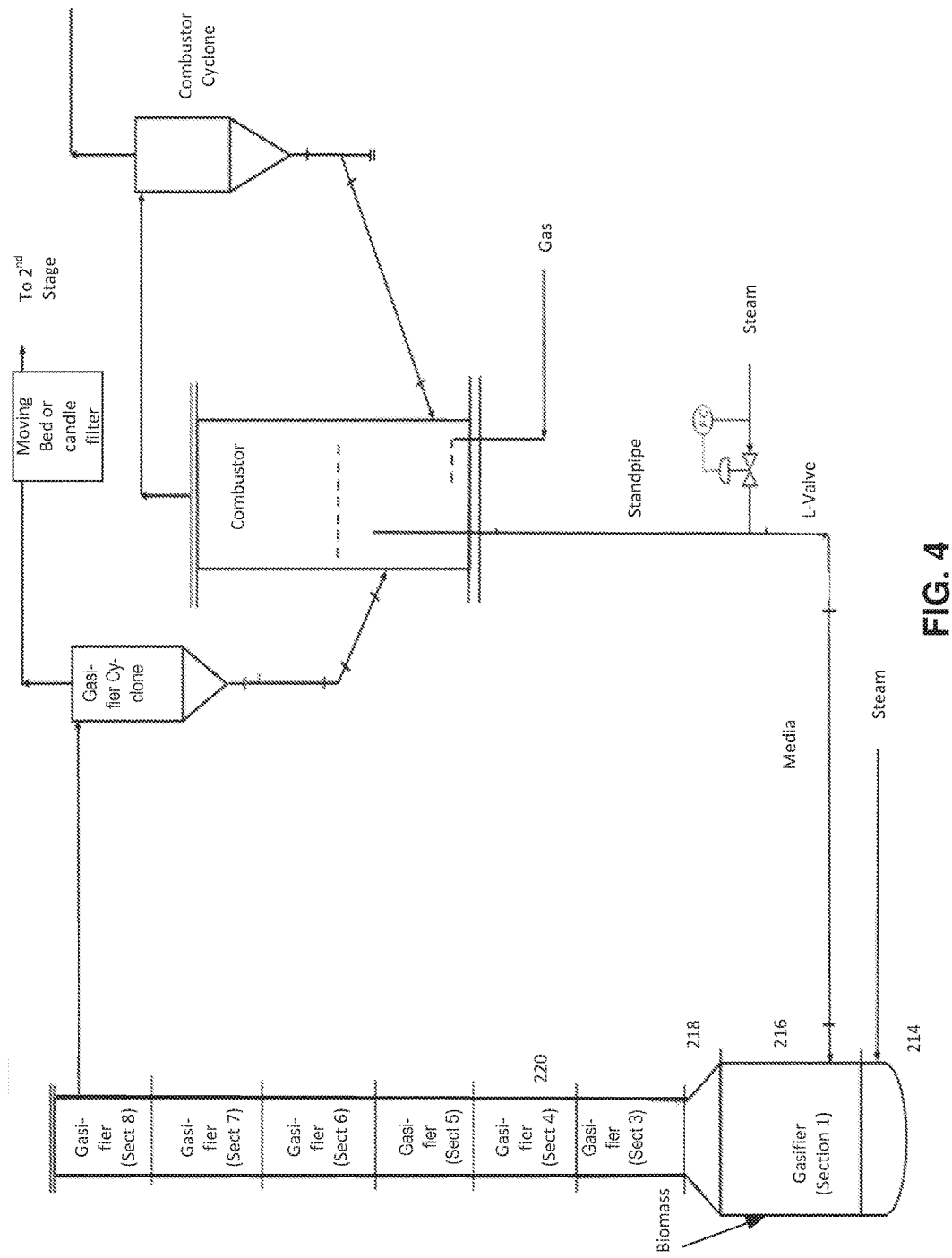
FIG. 4 illustrates a diagram of the first stage reactor including the circulating fluidized bed reactor coupled with a char combustor in accordance with some embodiments.
Figure 5:
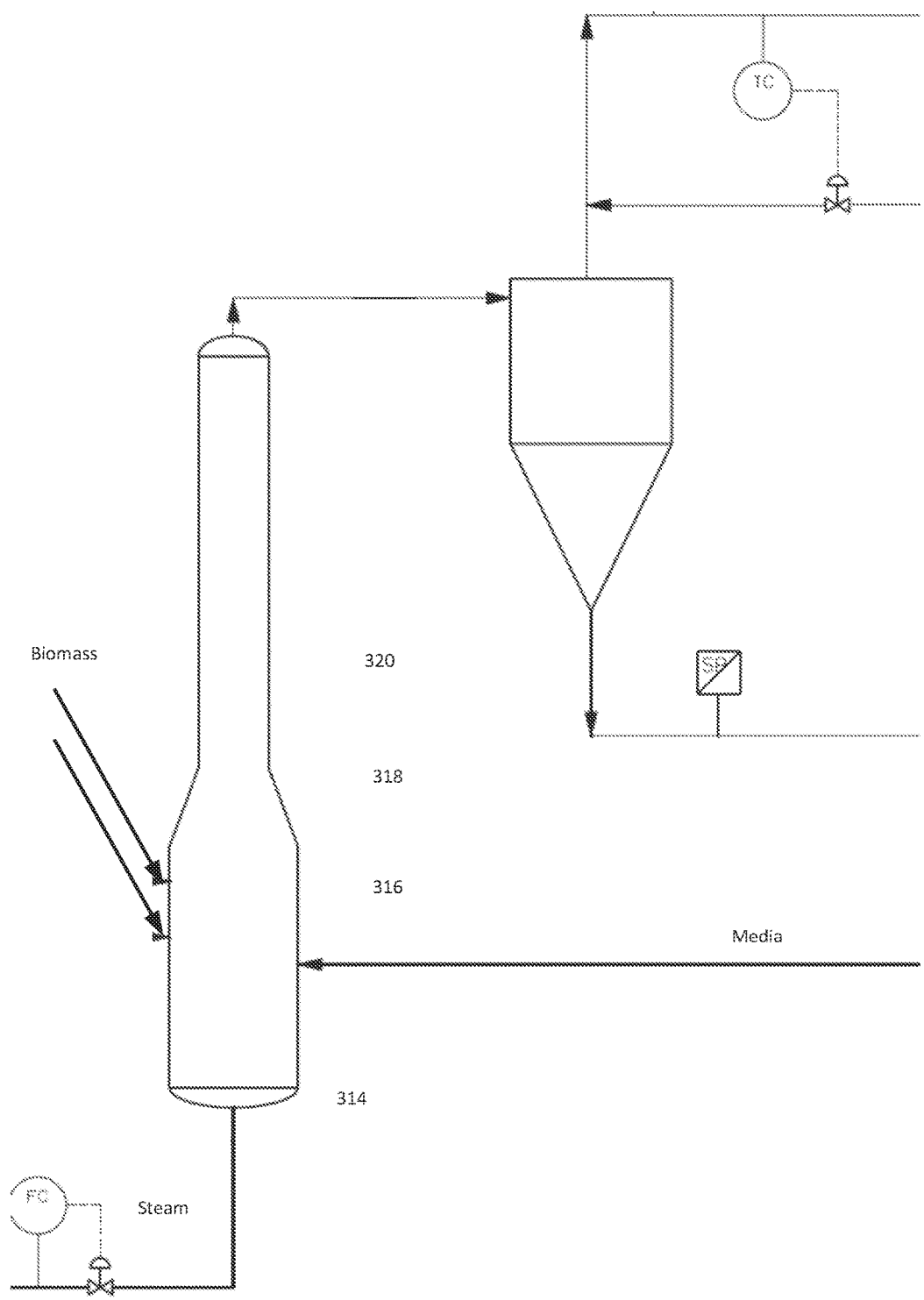
FIG. 5 illustrates a diagram of the circulating fluidized bed reactor having multiple sections that form a shape and an operation of the circulating fluidized bed reactor in accordance with some embodiments.
Figure 6:
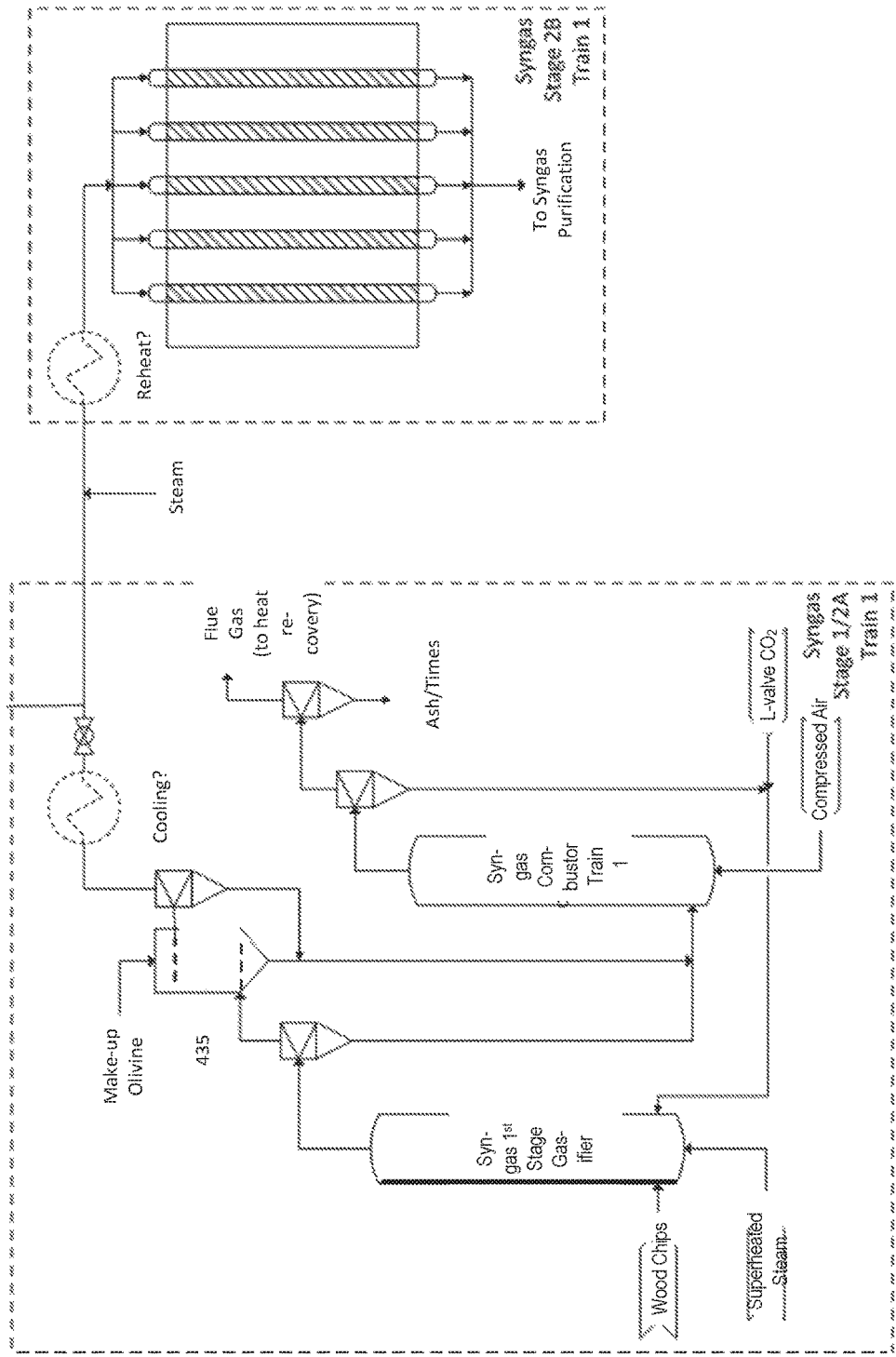
FIG. 6 illustrates a diagram of a densely packed moving bed coupled to the reactor in the first stage via the primary cyclone in accordance with some embodiments.

The integrated biofuels plant in its various configurations for biomass conversion employs a multi-stage BRR system such as a two-stage BRR system, in which the renewable carbon content of gasoline, jet fuel, diesel fuel, and/or similar fuels, are optimized for value to include: 1) Products with 100% biogenic carbon content and 2) products with 50-100% biogenic carbon. FIGS. 4, 5 and 6 show various examples of how the BRR may be implemented.

Stage 2 of the BRR system (i.e. BRR Stage 2), in the biomass-to-syngas ("BTS") process, (see FIGS. 1 and 2), can be configured to reform bio-syngas concurrently with natural gas and/or recycled process gas streams to maximize overall process energy efficiency and/or minimize capital costs to produce fuel products with 50-100% biogenic carbon.

BRR Stage 2 can be a conventional tubular reactor that employs a proprietary catalyst tailored to crack phenolic tars (e.g., $C_{6+}$) and reform light hydrocarbon gases (e.g., $C_1$-$C_4$) in bio-syngas produced by biomass gasification in Stage 1 of the BRR.

Stage 2 of the BRR can also be used as a dual or multi-purpose reformer to concurrently process natural gas and recycle process gases in conjunction with the bio-syngas from BRR Stage 1.

The configuration options for the flexible options for utilizing naphtha from a LTFT process in a plant converting biomass to syncrude or transportation fuels include: 1) BTS with LTFT producing drop-in fuels (e.g., bio-gasoline, bio-diesel, etc.) and 2) BTS with LTFT producing FT syncrude.

FIG. 1 illustrates a diagram of flexible options for utilizing Fischer-Tropsch products in an integrated plant 100 using recycling loops for converting biomass into transportation fuels having a biogenic content of between 50% and 100% in accordance with some embodiments.

As shown in FIG. 1, the integrated plant 100 can include an interconnected set of two or more stages of reactors forming a bio-reforming reactor 110 (e.g., SDF BTS) configured to generate chemical grade syngas for a LTFT reactor train 120. The syngas is derived from biomass fed to the bio-reforming reactor 110, in which the biomass includes wood chips. While not expressly shown for the bio-reforming reactor 110 of FIG. 1, a first stage (e.g., BRR Stage 1) of the bio-reforming reactor 110 includes a circulating fluidized bed reactor that has one or more media inputs to feed heat-absorbing media, a vessel to circulate the heat-absorbing media, and one or more biomass inputs to supply the biomass. The first stage of the bio-reforming reactor 110 is configured to cause a set of chemical reactions in the biomass to produce reaction products of constituent gases, tars, chars, and other components, which exit through a reactor output from the first stage. (See at least FIG. 3 and the description therefor for the BRR Stage 1.) A second stage for the bio-reforming reactor 110 (e.g., BRR Stage 2) has an input configured to receive a stream of some of the reaction products including the constituent gases and at least some of the tars as raw syngas. The second stage of the bio-reforming reactor 110 is further configured to chemically react the raw syngas within a vessel of the second stage to yield a chemical grade syngas by further processing including cracking and/or reforming the 1) tars, 2) light hydrocarbons ($C_1$-$C_4$) or 3) both into constituent molecules. (See, also, at least FIG. 3 and the description therefor for the BRR Stage 2.) As further shown FIG. 1, the chemical grade syngas is mixed with a natural gas-derived syngas from a steam methane reformer 130 to form a mixed syngas that is supplied to an input of the LTFT reactor train 120 configured to produce LTFT fuel product. The integrated plant is configured with one or more recirculation loops 121 and 123 for respectively recirculating at least $C_1$-$C_5$ products in purge gases and undesired reaction products from the LTFT reactor train back to either i) the steam methane reformer 130, ii) the input of the second stage of the bio-reforming reactor 110, or iii) both in order to aid in converting the biomass supplied to the first stage of the bio-reforming reactor 120 into at least syncrude or other transportation fuels by way of the LTFT process using both the chemical grade syngas and a portion of the recirculated $C_1$-$C_5$ products.

The integrated plant 100 can further include a heavy hydrocarbon reactor train 140 configured for upgrading Fischer-Tropsch products from the LTFT process. The integrated plant 100 is configured to fluidly connect the heavy hydrocarbon reactor train 140 for upgrading Fischer-Tropsch products to the LTFT reactor train 120 to supply a stream of $C_{5+}$ products, which can be liquids at plant-operating temperatures, to the heavy hydrocarbon reactor train 140 for upgrading Fischer-Tropsch products. The reactor train 140 configured for upgrading the Fischer-Tropsch products to provide commercial grade i) bio-gasoline, ii) bio-diesel, or iii) both as the transportation fuels that were derived from biomass including wood to have the biogenic content of between 50% and 100%.

The heavy hydrocarbon reactor train 140 configured for upgrading Fischer-Tropsch products from the LTFT process can include a one-stage or two-stage hydrocracker with optional recycling of the $C_{5+}$ products. The hydrocracker is configured to use $H_2$ generated in the integrated plant 100. The $H_2$ can be from a stream of $H_2$ from a stream of $H_2$, CO, and $C_1$-$C_5$ products from the LTFT process before it is recirculated in the recirculation loop 121 or 123 respectively back to the steam methane reformer 130 or the second stage of the bio-reforming reactor 110 for the LTFT process. Alternatively, or additionally, the $H_2$ can be from a stream of $H_2$ from gas separators 150 resulting from a $H_2$ pressure swing adsorption of the syngas from the interconnected set of two or more stages of reactors of the bio-reforming reactor 110. For example, the hydrogen recirculation feedback loop can configured to use a hydrogen pressure swing absorber to separate out the hydrogen gas from the purge gas of the downstream LTFT reactor train. The LTFT reactor train 120 can also be configured to use the stream of $H_2$ from the pressure swing adsorption of the syngas from the interconnected set of two or more stages of reactors of the bio-reforming reactor 110. Next, as needed, the stream of $H_2$ can be used for adjusting a ratio of the $H_2$ and CO in input to the LTFT reactor train 120 for achieving a proper ratio for the LTFT process. See later on for different ratios.

The integrated plant 100 further includes a first recycling loop 125 for recycling at least a portion of a stream of $H_2$, CO, and $C_1$-$C_5$ products for use as fuel gas. As shown in FIG. 1, the stream of $H_2$, CO, and $C_1$-$C_5$ products can be derived from the LTFT reactor train 120, the heavy hydrocarbon reactor train 140 for upgrading Fischer-Tropsch products, or both. A fuel gas mixing and distribution component 129 is configured to receive fuel gas from the first recycling loop 125 and supply that fuel gas to at least the heaters for the tubular chemical reactor. An energy balance of the integrated plant 100 is used for determining how much (if any) of the $H_2$, CO, and $C_1$-$C_5$ products from the LTFT reactor train 120 or the heavy hydrocarbon reactor train 140 for upgrading Fischer-Tropsch products is recycled for use as the fuel gas. The energy balance of the integrated plant 100 is also used for determining how much (if any) of the $H_2$, CO, and $C_1$-$C_5$ products from the LTFT reactor train 120 is recirculated in the recirculation loop 121 back to the steam methane reformer 130 and/or the second stage of the bio-reforming reactor 110 for use as a chemical feedstock.

The integrated plant 100 can further include at least one flash evaporator (not shown) configured to separate a stream of at least $H_2$, CO, and $C_1$-$C_5$ products from the LTFT reactor train 120, the heavy hydrocarbon reactor train 140 for upgrading Fischer-Tropsch products, or both. The one or more flash evaporators of the LTFT reactor train 120 can be further configured to separate another stream of water-soluble alcohols (e.g., methanol, ethanol, propanol, butanol, etc.) from the LTFT process for use a fuel gas to heat the heaters of various other plant components.

The integrated plant 100 can further include a second recycling loop 127 for recycling the stream of water-soluble alcohols from the LTFT process for use as fuel gas. The fuel gas mixing and distribution component couples to the second recycling loop for recycling water-soluble alcohols. A distillation unit 128 of the integrated plant 100 can be configured to remove water from the stream of water-soluble alcohols from the LTFT process to produce a distillate of about 75% by weight alcohols for use as the fuel gas. The stream of water-soluble alcohols, or the distillate thereof, is also a part of the energy balance of the integrated plant 100. As such, the energy content of the stream of water-soluble alcohols is used for determining how much (if any) of the stream of $H_2$, CO, and $C_1$-$C_5$ products from the LTFT process is recycled for use as the fuel gas, as well as how much (if any) of the stream of $H_2$, CO, and $C_1$-$C_5$ products from the LTFT process that is recirculated in the recirculation loop back 121 or 123 respectively to the steam methane reformer 130 or the second stage of the bio-reforming reactor 110.

The integrated plant 100 can also include one or more control systems 139 with one or more sensors configured to monitor a chemical composition feedback signal of the mixed syngas supplied to the LTFT reactor train 120 to ensure a proper chemical composition and ratio of $H_2$ to CO is fed to the LTFT reactor train 120 for the LTFT process.

As such, FIG. 1 shows an integrated plant 100 in which $C_1$-$C_5$ products are recycled to at least the steam methane reformer 130 for a LTFT process to produce transportation fuels such as bio-gasoline and bio-diesel, as well as the following:

Syngas from a BTS process feeds a LTFT unit.
$H_2$/CO and FT $C_1$-$C_5$ hydrocarbons are recycled to the SMR as feed gas.
FT $C_5+$ hydrocarbons are processed to produce bio-gasoline and/or bio-diesel.
Natural gas, FT $C_1$-$C_5$ hydrocarbons and FT alcohols are used as fuel gas.
Net export of electricity produced by COGEN with heat recovered from LTFT reactor.
Drop-in fuels can be distributed locally.

Another CO2 feedback loop may connect to at least the tubular chemical reactor of the second stage. The carbon-dioxide gas feedback loop may cooperate with a CO2 separation unit 150 to supply a fraction of the CO2 gas that is removed from the chemical grade syngas derived from the biomass and produced from the reactor output of the tubular chemical reactor of the second stage in order to supply extracted CO2 gas to the biomass feed system. The CO2 gas may be supplied to at least biomass dryers to dry and be motive gas for the biomass. The biomass may be subsequently supplied to the one or more feed supply inputs of the circulating fluidized bed reactor in BRR Stage 1.

Figure 2:
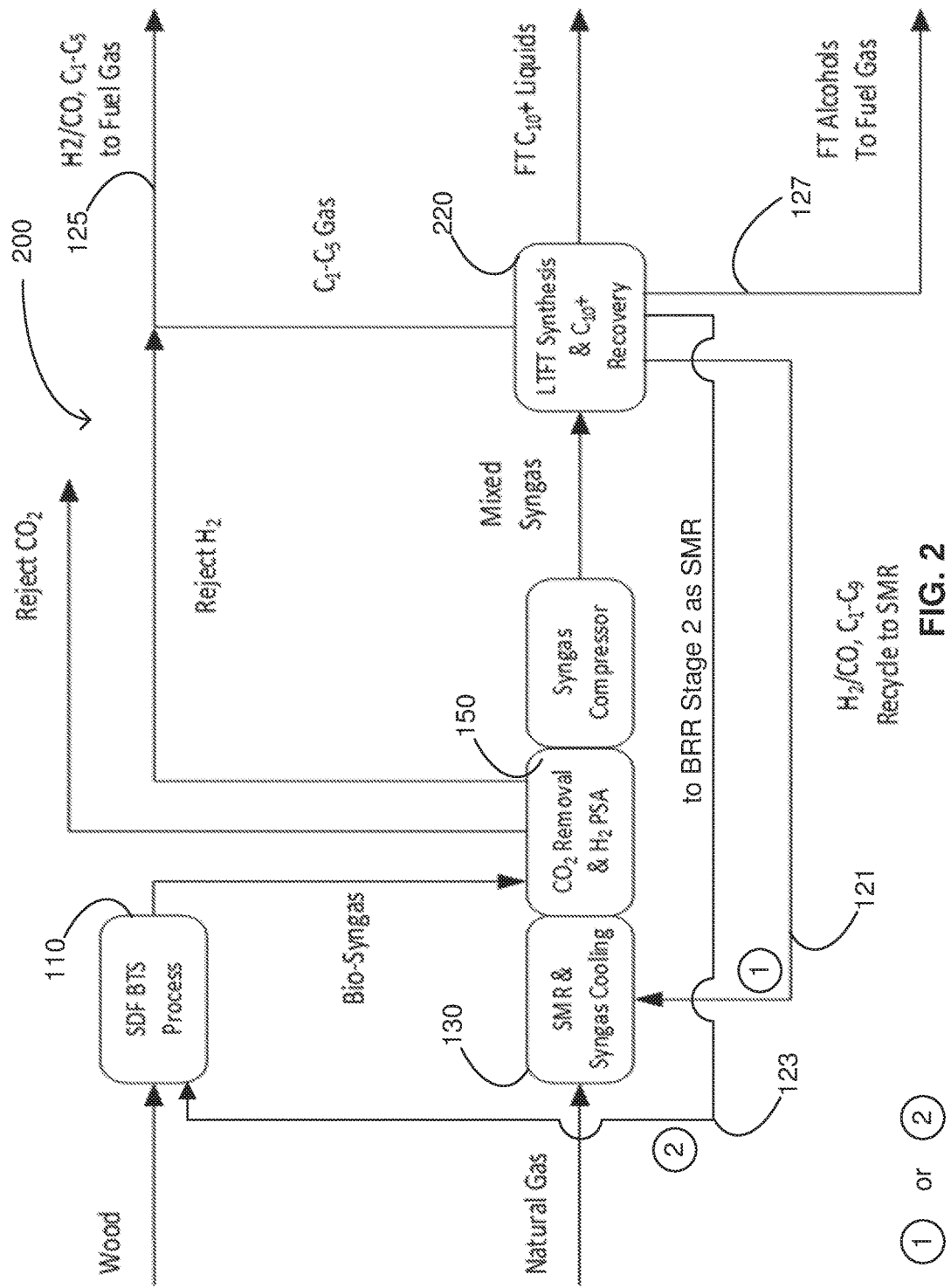
FIG. 2 illustrates a diagram of flexible options for utilizing Fischer-Tropsch products in an integrated plant for converting biomass including wood into syncrude having a biogenic content of between 50% and 100% in accordance with some embodiments.

FIG. 2 illustrates a diagram of flexible options for utilizing Fischer-Tropsch products in an integrated plant for converting biomass, including wood chips, into syncrude having a biogenic content of between 50% and 100% in accordance with some embodiments. Features of the integrated plant 200 shared with the integrated plant 100 are indicated with the same reference numerals and, as such, it should be understood the description of such features for the integrated plant 100 apply to the integrated pant 200 as well.

As shown in FIG. 2, the integrated plant 200 can include the interconnected set of two or more stages of reactors forming the bio-reforming reactor 110 (e.g., SDF BTS)

configured to generate syngas for a LTFT reactor train 220 that is different from the LTFT reactor train 110 because of added $C_{10+}$ recovery. Again, the syngas is derived from biomass fed to the bio-reforming reactor 110, which biomass includes wood and then the plant uses the products from the various recirculation loops to increase a percentage of biogenic content of produced fuel products. Like the integrated plant 100, the integrated plant 200 is configured with the BRR Stage 1 including the circulating fluidized bed reactor configured to cause a set of chemical reactions in the biomass to produce reaction products of constituent gases, tars, chars, and other components, which exit through the reactor output from the first stage. And like the integrated plant 100, the integrated plant 200 is configured with the BRR Stage 2 including the input configured to receive the stream of at least some of the reaction products including the constituent gases and at least some of the tars as raw syngas. Again, the second stage of the bio-reforming reactor 110 is further configured to chemically react the raw syngas within the vessel of the second stage to yield the chemical grade syngas. The chemical grade syngas is also mixed with the natural gas-derived syngas from the steam methane reformer 130 to form the mixed syngas that is supplied to the LTFT reactor train 220, which is configured for the LTFT process with added $C_{10+}$ recovery. The integrated plant 200 is configured with the recirculation loop 121 or 123 like the integrated plant 100 for respectively recirculating at least $C_1$-$C_5$ products back to the steam methane reformer 130 or the second stage of the bio-reforming reactor 110. Such a configuration aids in converting the biomass supplied to the first stage of the bio-reforming reactor 110 to syncrude through the LTFT process.

Like the integrated plant 100, the integrated plant 200 can further include at least one flash evaporator configured to separate the stream of at least $H_2$, CO, and $C_1$-$C_5$ products from, in this case, the LTFT reactor train 220 for fuel gas. The one or more flash evaporators of the LTFT reactor train 220 can also be further configured to separate another stream of water-soluble alcohols from the LTFT process for the fuel gas. In addition, the flash evaporator of the LTFT reactor train 220 can be further configured to separate $C_6$-$C_9$ products from the LTFT process. In such a configuration, the stream of $H_2$, CO, and $C_1$-$C_5$ products from the LTFT process can further include the $C_6$-$C_9$ products forming a stream of at least $H_2$, CO, and $C_1$-$C_9$ products from the LTFT process as shown in FIG. 2. This stream of $H_2$, CO, and $C_1$-$C_9$ products from the LTFT process is recirculated in the recirculation loop 123 back to the steam methane reformer 130 and/or the second stage of the bio-reforming reactor 110 so that the LTFT process can generate and form more $C_{10+}$ products, as liquids at plant-operating temperatures, for the syncrude for refining by refiners. This will increase the biogenic carbon content. The LTFT train will form C10+ products for the syncrude that are i) derived from the syngas from BRR stage 2, which was ii) derived from biomass including wood in BRR Stage 1, in order for the syncrude to have the biogenic content of between 50% and 100%.

As such, FIG. 2 shows an integrated plant 200 in which $C_1$-$C_9$ products are recycled to at least the steam methane reformer 130 and/or the second stage of the BRR 110 in order for the LTFT process to produce syncrude with $C_{10+}$ products having the biogenic content of between 50% and 100%. FIG. 2 shows Syngas from a BTS process feeds a LTFT unit.
LTFT separates $C_{10+}$ fraction as syncrude product.
$H_2$/CO and FT $C_1$-$C_9$ hydrocarbons are recycled to the SMR and/or to the BRR stage 2 as feed gas.

Natural gas, FT $C_1$-$C_5$ hydrocarbons and FT alcohols are used as fuel gas.
Net export of electricity produced by COGEN with heat recovered from LTFT reactor.
Investment cost for product upgrading is eliminated.

LTFT Process

FIGS. 1 and 2 illustrate examples of integrated plants incorporating a LTFT synthesis process that receives mixed syngas from both the BTS and SMR processes, wherein FIG. 1 shows an integrated plant 100 for production of transportation fuels through the LTFT process, and FIG. 2 shows an integrated plant 200 tuned with recycle loops for production syncrude $C_{10+}$ liquids through the LTFT process.

The Fischer-Tropsch process in the low-temperature Fischer-Tropsch trains 120 and 220 is a collection of chemical reactions that converts a mixture of carbon monoxide and hydrogen into liquid hydrocarbons. The Fischer-Tropsch process involves a series of chemical reactions that produce a variety of hydrocarbons, many of which have the formula $C_nH_{(2n+2)}$ for alkanes:

$$(2n+1)H_2 + nCO \rightarrow C_nH_{(2n+2)} + nH_2O$$
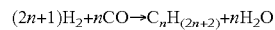

The value for n is typically an integer in the range of 10 to 20 but can range much higher to C30+. Most of the alkanes produced tend to be straight chain, which are suitable for bio-diesel. In addition to alkane formation, competing reactions give small amounts of alkenes, as well as alcohols and other oxygenated hydrocarbons. The lower temperature of the LTFT process, as opposed to a classical high-temperature Fischer-Tropsch process, produces different amounts of alkenes, wherein the LTFT process produces a less alkene-rich syncrude than does the high-temperature Fischer-Tropsch process, which affords better transportation fuels in at least some embodiments of the integrated plant.

For each of the integrated plants 100 and 200, mixed compressed syngas is pre-heated and fed to the LTFT synthesis reactor train (e.g., LTFT reactor train 120 or 220) were it is converted to a $C_1$-$C_{30+}$ primary product. The $C_1$-$C_9$ light-end products are flashed overhead to a 3-phase decanter while the $C_{10+}$ liquid wax product is cooled and stored in liquid form for further upgrading or shipped to a refinery. The heavy hydrocarbons include waxes, etc.

The 3-phase decanter separates a non-condensable gas fraction, alcohol/water fraction and an organic phase condensate fraction. The alcohol/water fraction is fed to a distillation unit to remove water and produce a distillate with ~75 wt % alcohols. The $C_1$-$C_9$ organic phase condensate is fed to a splitter column to recover three streams, viz., (a) $C_1$-$C_4$ light hydrocarbons as overhead that is combined with the recovered alcohol stream for use as fuel gas, (b) $C_5$-$C_9$ naphtha fraction that is combined with non-condensable gases from the decanter and recycled to the SMR saturator as feed gas, and (c) a residual $C_{10+}$ liquids product that is cooled and combined with the stored $C_{10+}$ fraction from the synthesis reactor.

The $C_1$-$C_9$ recycle stream offers alternatives with respect to fuel gas and product volume considerations. For instance, a minimum recycle case can be configured where all of the recovered $C_5$-$C_9$ is used as fuel gas and 25% of the $H_2$/CO/$C_1$-$C_5$ gas from the decanter is recycled to the SMR. The balance of decanter gas, recovered alcohols and $C_1$-$C_5$ gas from the $C_{10+}$ splitter is sent to the fuel gas system.

To increase syncrude production volume, all of the $C_5$-$C_9$ naphtha fraction is recycled to the SMR while the $C_1$-$C_4$ fraction recycle amount is adjusted to maximize production. Maximizing syncrude production requires more natural gas and a larger SMR to reform the $H_2$/CO/$C_1$-$C_9$ recycle stream. If maximizing bio-carbon in the product is the goal, then an optimum is located in a region where 65%-80% of the $H_2/CO/C_1$-$C_5$ gas from the decanter is recycled to the SMR with 100% of the $C_5$-$C_9$ from the $C_{10+}$ splitter.

Table 1 illustrates the impacts on different value drivers for a constant biomass feed rate for three different recycle configurations.

TABLE 1

Influence of LTFT recycles on production and bio-carbon content.

|  |  | Min $C_1$-$C_9$ Recycle | High $C_1$-$C_9$ Recycle | Max $C_1$-$C_9$ Recycle |
|---|---|---|---|---|
| Input Parameters Recycle to SMR | | | | |
| $H_2/CO/CO_2/C_1$-$C_4$ | % | 25 | 70 | 99 |
| $C_5$-$C_9$ | % | 0 | 100 | 100 |
| Capacity Adjustments | | | | |
| SMR capacity | % | 109 | 94 | 127 |
| Results $C_{10+}$ Syncrude | | | | |
| Production | BPD | 12,360 | 12,430 | 14,739 |
| Bio-carbon | % | 59.7 | 76.0 | 74.8 |
| LCA GHG reduction | % | 23.2 | 23.8 | 15.1 |
| Materials/Utilities | | | | |
| Biomass | DTPD | 4,400 | 4,400 | 4,400 |
| Natural gas | MMSCFD | 75.3 | 74.2 | 99.5 |
| Electricity | MW | −24.5 | −21.1 | −31.2 |

One or more control systems with one or more sensors monitor a chemical composition feedback signal of the first stream of the syngas components from the SMR and the second stream of the syngas components from the second stage of the BRR. The control systems work with the one or more sensors to ensure the proper chemical composition of chemicals are fed to the LTFT in order to produce a high-quality syngas mixture for LTFT synthesis. The BRR's reactor control system and the SMR's control system may be part of the one or more control systems that optionally cooperate with a plant control system that monitors the exact chemical composition being fed to the LTFT.

Thus, the BRR and SMR reactor are in parallel and cooperate with each other to produce a high-quality syngas mixture for LTFT synthesis. The resultant products from the two reactors may be used for the LTFT synthesis. The SMR provides hydrogen rich syngas to be mixed with the potentially carbon monoxide rich syngas from the BRR. The combination of syngas component streams from the two reactors can provide the required hydrogen to carbon monoxide ratio for LTFT synthesis. The SMR reactor control system and a BRR reactor control system interact to produce a high-quality syngas mixture for the LTFT synthesis.

The multiple control systems interact with each other. The SMR reactor control system interacts with the gasifier reactor control system based on the chemical composition feedback from the chemical sensors to produce a high-quality syngas mixture for methanol synthesis. For example, the flow of reactants through the SMR reactor may be used to dynamically control the hydrogen-to-carbon monoxide ratio supplied to the LTFT while trying to maintain flow of reactants in the BRR reactor relatively steady.

Methods

At least one method associated with the integrated plant 100 or 200 includes producing syngas for a LTFT process from biomass fed to a bio-reforming reactor of an interconnected set of two or more stages of reactors that form the bio-reforming reactor. Biomass including wood is fed to a circulating fluidized bed reactor of the first stage of the bio-reforming reactor through one or more biomass inputs of the circulating fluidized bed reactor. Heat-absorbing media is fed into the circulating fluidized bed reactor through one or more media inputs, and the heat-absorbing media is circulated in a vessel of the circulating fluidized bed reactor. Reaction products of constituent gases, tars, chars, and other components are produced from a set of chemical reactions in the biomass in the first stage and subsequently sent through a reactor output of the circulating fluidized bed reactor of the first stage. A stream of some of the reaction products including the constituent gases and at least some of the tars as raw syngas are received through an input of the second stage of the bio-reforming reactor. The raw syngas is chemically reacted within a vessel of the second stage to yield a chemical grade syngas by further cracking the tars, excess methane, or both into constituent molecules. The chemical grade syngas is mixed with a natural gas-derived syngas from a steam methane reformer to form a mixed syngas. The mixed syngas is sent to a LTFT reactor train configured for a LTFT process. At least $C_1$-$C_5$ products are sent back to the steam methane reformer or the second stage of the bio-reforming reactor from the LTFT reactor train through a recirculation loop to aid in converting the biomass supplied to the first stage of the bio-reforming reactor to syncrude or transportation fuels through the LTFT process.

The method further includes separating a first stream of at least $H_2$, CO, and $C_1$-$C_5$ products from the LTFT process and a second stream of water-soluble alcohols from the LTFT process with at least one flash evaporator of the LTFT reactor train.

The method further includes recycling at least a first portion of the first stream of $H_2$, CO, and $C_1$-$C_5$ products for use as fuel gas with a first recycling loop; and determining the first portion of the first stream of $H_2$, CO, and $C_1$-$C_5$ products from the LTFT process to be recycled for use as the fuel gas and a second portion of the first stream of $H_2$, CO, and $C_1$-$C_5$ products from the LTFT process to be recirculated in the recirculation loop back to the steam methane reformer or the second stage of the bio-reforming reactor for the LTFT process. The proportion of how much is used as fuel gas and how much is sent to the second stage bioreforming reactor is based on an energy balance of the integrated plant.

The method further includes recycling the second stream of water-soluble alcohols from the LTFT process for use as the fuel gas with a second recycling loop. The second stream of water-soluble alcohols is a part of the energy balance of the integrated plant used for determining the first portion of the first stream of $H_2$, CO, and $C_1$-$C_5$ products from the LTFT process that is recycled for use as the fuel gas, as well as the second portion of the first stream of $H_2$, CO, and $C_1$-$C_5$ products from the LTFT process that is recirculated in the recirculation loop back to the steam methane reformer or the second stage of the bio-reforming reactor for the LTFT process.

The method further includes removing water from the second stream of water-soluble alcohols from the LTFT process through a distillation unit configured to the remove water to produce a distillate of about 75% by weight alcohols for use as the fuel gas.

The method further includes supplying a third stream of $C_{5+}$ products to a heavy hydrocarbon reactor train configured for upgrading Fischer-Tropsch products; and upgrading the Fischer-Tropsch products from the LTFT process with the reactor train configured for the upgrading to provide bio-gasoline, bio-diesel, or both as the transportation fuels.

In some embodiments, the method further includes hydrocracking as part of upgrading the Fischer-Tropsch products from the LTFT process, the hydrocracking in a one- or two-stage hydrocracker with optional recycling of the $C_{5+}$ products; and using in the hydrocracker i) a stream of $H_2$ from the second portion of the first stream of $H_2$, CO, and $C_1$-$C_5$ products from the LTFT process before it is recirculated in the recirculation loop back to the steam methane reformer or the second stage of the bio-reforming reactor for the LTFT process, ii) a stream of $H_2$ from pressure swing adsorption of the syngas from the interconnected set of two or more stages of reactors of the bio-reforming reactor configured, or iii) both.

The method further includes using the stream of $H_2$ from the pressure swing adsorption of the syngas from the interconnected set of two or more stages of reactors of the bio-reforming reactor to adjust a ratio of the $H_2$ and CO in the LTFT reactor train for the LTFT process. The syngas stream from the decomposition coming out of the bio-reforming reactor may have a 1.1:1 or a 1.2:1 hydrogen to carbon monoxide ratio. A ratio controller with sensors located at the input of the high temperature Fischer-Tropsch train will control the hydrogen to carbon monoxide ratio of syngas going into the Fischer-Tropsch train. The ratio will be about 1.5:1 to 2.0:1 hydrogen to carbon monoxide controlled by the controller and measured by hydrogen and carbon monoxide sensors at that input. In an embodiment, $H_2$:CO ratios of 1.8:1 to as high as 2.1:1 are used. Note, the higher ratio may contain too much $CO_2$ for the Fischer-Tropsch reactor train and the $CO_2$ removal unit may be inline to recirculate CO2 gas into other processes in the plant.

The method further includes separating $C_6$-$C_9$ products from the LTFT process with at least one flash evaporator of the LTFT reactor train configured to separate the $C_6$-$C_9$ products from the LTFT process. The second portion of the first stream of $H_2$, CO, and $C_1$-$C_5$ products from the LTFT process further includes the $C_6$-$C_9$ products forming a fourth stream of at least $H_2$, CO, and $C_1$-$C_9$ products from the LTFT process.

The method further includes recirculating the fourth stream of $H_2$, CO, and $C_1$-$C_9$ products from the LTFT process in the recirculation loop back to the steam methane reformer and/or the second stage of the bio-reforming reactor for the LTFT process to form $C_{10+}$ products for the syncrude that is derived from biomass including wood to have the biogenic content of between 50% and 100%.

The method further includes monitoring a chemical composition feedback signal of the mixed syngas supplied to the LTFT reactor train with one or more control systems including one or more sensors to ensure a proper chemical composition and ratio of $H_2$ to CO is fed to the LTFT reactor train for the LTFT process.

Additional Discussion

The following drawings and text describe additional aspects of different embodiments of the design.

Figure 3:
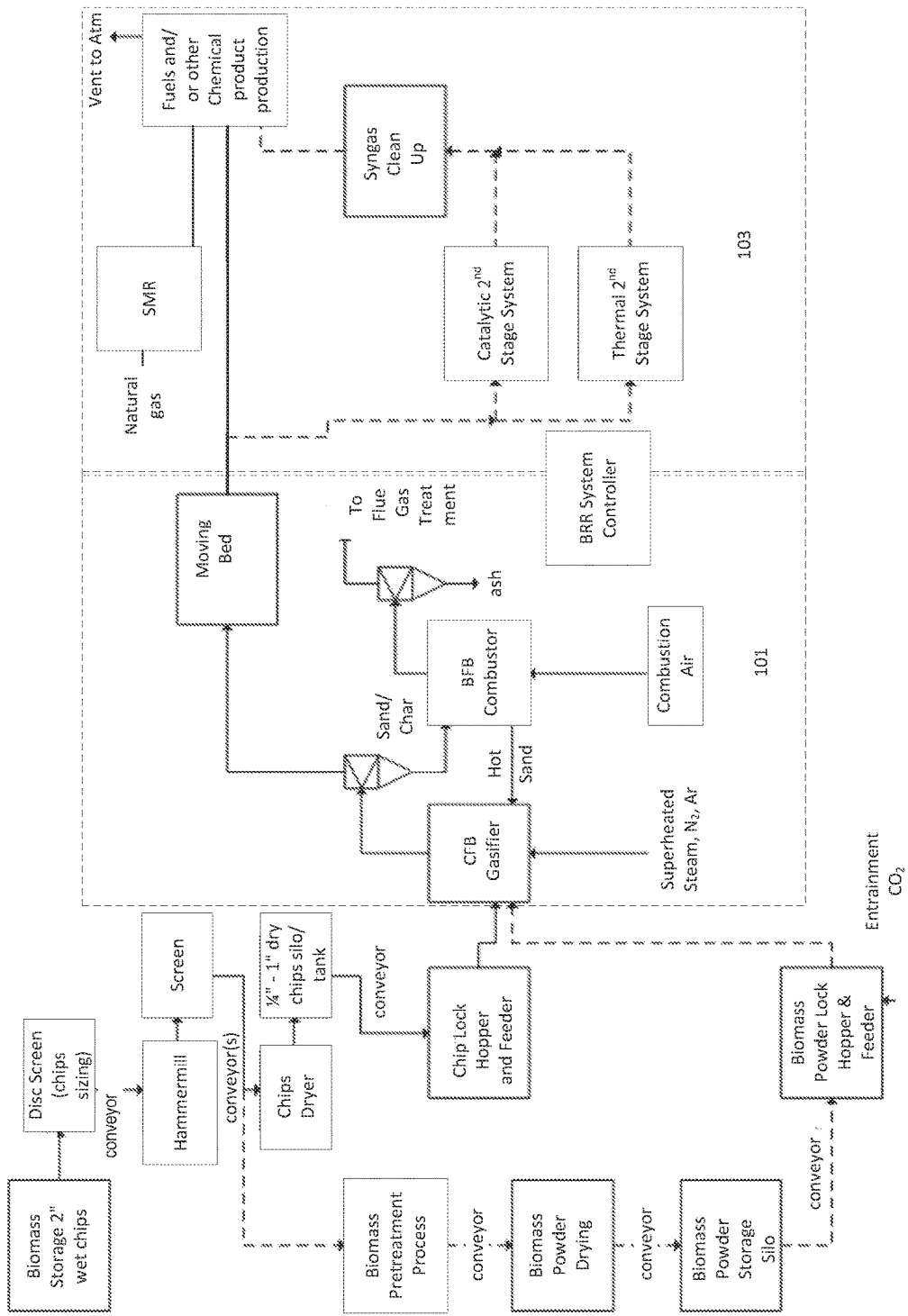
FIG. 3 illustrates a diagram of an integrated plant with an interconnected set of two or more stages of reactors to form a bio-reforming reactor that generates syngas in accordance with some embodiments.

FIG. 3 illustrates a diagram of an embodiment of integrated plant with an interconnected set of two or more stages of reactors to form a bio-reforming reactor that generates syngas.

The integrated plant may have an interconnected set of two or more stages 101, 103 of reactors. An example first stage reactor 101 is meant to cause the devolatilization of woody biomass into its constituent gases, tars, chars, ash, and other components. In the first stage, devolatilization of woody biomass occurs by chemically bio-reforming or decomposing the biomass via a gasification of a steam-based reaction where the steam, as the oxidant, at a given temperature chemically decomposes the complex chains of molecules of the biomass into smaller molecules composed of 1) solids, such as char (unreacted carbon and ash), as well as 2) gases, such as hydrogen ($H_2$), carbon monoxide (CO), carbon dioxide $CO_2$, methane ($CH_4$), etc. Thus, a decomposition reaction of the biomass through steam gasification occurs chemically, which may be referred to as bio-reforming. The second stage 103 of the reactor is meant to perform further clean up the syngas to make the raw syngas from the first stage 101 into chemical grade syngas by further cracking the tars and/or excess methane into their constituent molecules so that the resultant syngas stream can be used in other chemical reactions rather than just being a source of fuel for burning.

The integrated plant starting from biomass (dried or not dried) may feed a two-stage bio-reforming reactor (BRR) 101, 103. The bio-reforming reactor produces a chemical grade syngas to produce fuels or other chemicals such as Methanol (MEOH), Methanol to Gasoline (MTG), High Temperature Fischer Tropsch process (HTFT), LTFT process, etc. A Steam Methane Reactor may or may not be included with the integrated plant in order to supply extra hydrogen when combined with the syngas from the bio-reforming reactor. Biomass could be any non-food source biomass such as wood, sugarcane, bamboo, sawgrass, bagasse, palm empty fruit basket, corn stover, etc. In an embodiment, a low sulfur content woody biomass is chosen as the source biomass. In an embodiment, a combination of these biomass sources is chosen as can be supplied locally to the integrated plant.

The biomass feed system is configured to supply the biomass to one or more biomass inputs into the circulating fluidized bed reactor in the first stage 101. The biomass feed system further includes any of 1) a rotary valve associated with a pressurized lock hopper system, 2) a rotary valve from a non-pressurized hopper, 3) a screw feeder system, or 4) combination of the above. A variety of sizes of the biomass, such as dimensions of small fine particles, less than 500 microns, and/or chunks, such as an ¾ inch or half-inch or ¼ inch long chip of wood, may be fed by the above variety of feeding mechanisms (e.g. a screw-type feeding mechanism, a lock hopper mechanism, etc.).

The biomass feed system supplies the biomass across a pressure boundary from atmospheric to above the operating pressure within the circulating fluidized bed reactor in the first stage 101. High pressure steam and gravity are used to supply the biomass through the one or more biomass inputs across and out into the vessel of the circulating fluidized bed reactor to prevent backpressure on the biomass feed system and obtain better mixing throughout the vessel.

A first stage 101 of the bio-reforming reactor may include a circulating fluidized bed reactor that has one or more biomass inputs to supply the biomass from the biomass feed system, one or more steam inputs to feed heat-absorbing media, a vessel to circulate the heat-absorbing media, and has a sparger to input steam. The heat-absorbing media may include silica sand, ilmenite, olivine, dolomite, zeolite catalysts, and any combination of the five. In general, the biomass, steam, and heat-absorbing media circulate in the vessel/fluidized bed of the reactor. The first stage 101 is configured to cause a chemical devolatilization of the biomass into its reaction products of constituent gases, tars, chars, and other components, which exit through a reactor output from the first stage 101.

The first stage 101 includes the circulating fluidized bed reactor coupled with a char combustor. Hot heat-absorbing media for fluidization (e.g. the silica sand or olivine) may be circulated between the circulating fluidized bed gasifier and the char combustor, providing most of the necessary heat to gasify the incoming biomass and utilizing the char produced in the circulating fluidized bed reactor. The char combustor could be a bubbling fluidized bed or as a circulating fluidized bed (riser configuration). The char combustor is configured to heat and supply the circulating heat-absorbing media to the one or more media inputs into the circulating fluidized bed reactor. The reactor output from the first stage 101 couples to a primary cyclone and dipleg that has an outlet to the bubbling fluidized bed char combustor. The char combustor may or may not have supplemental fuel added in the form of natural gas, propane, fuel gas, torch oil, kerosene, or additional biomass. The operating temperature of the char combustor will be about 100-150 C above the temperature of the circulating fluidized bed reformer. The char combustor will have an outlet (return to the circulating fluidized bed reformer) for the circulating media either through a first stage 101 cyclone in the case of the circulating fluidized bed combustor or an overflow (or underflow) port to a standpipe in the case of the bubbling bed combustor configuration.

The second stage reactor 103 of the bio-reforming reactor may contain a radiant heat reactor that either 1) operates at a high enough temperature such that no catalyst is needed to decompose the tars and excess methane in the syngas stream or 2) operates with a catalyst at a lower temperature and then occasionally rejuvenates the catalyst in the second stage 103.

The second stage 103 of the bio-reforming reactor has an input configured to receive a stream of some of the reaction products that includes 1) the constituent gases and 2) at least some of the tars as raw syngas, and then chemically reacts the raw syngas within a vessel of the second stage 103 to make the raw syngas from the first stage 101 into a chemical grade syngas by further cracking the tars, excess methane, or both into their constituent molecules so that a resultant syngas stream going out a reactor output of the second stage 103 can be used in other chemical reactions rather than just being a source of fuel for burning.

In an embodiment, the catalytic reactor in the second stage 103 removes a substantial amount of tars and methane remaining in the raw syngas. The catalytic reactor reacts with the raw syngas to create a resultant chemical grade synthesis gas that is substantially tar-free, (less than 100 ppm total tars including benzene and naphthalene and more likely less than 5 ppm) and with a methane content as low as 0.5%% (dry basis) and certainly no higher than 10% (dry basis).

Going back to stage 1, a candle filter or moving bed may be an exit component from stage 1 or an entry component into stage 2. The syngas from stage 1 may be sent to either a candle filter, which could operate as high as 900 C; a secondary cyclone for dust removal; or to a packed or moving bed of, for example, olivine, ilmenite, or dolomite, which could act as both a filter and a tar destroyer. If syngas from stage 1 goes through the candle filter, the integrated plant may still pass syngas to the olivine or dolomite bed for tar destruction.

The interconnected set of two or more stages of reactors 101, 103 form a bio-reforming reactor that generates syngas for any of 1) a methanol synthesis reactor, 2) a Methanol to Gasoline reactor train process, 3) a LTFT reactor train, 4) another transportation fuel process, and 5) any combination of these, that use syngas derived from biomass in the bio-reforming reactor.

FIG. 4 illustrates a diagram of an embodiment of the first stage reactor including the circulating fluidized bed reactor coupled with a char combustor.

The circulating fluidized bed reactor has multiple sections forming a shape and an operation of the circulating fluidized bed reactor. The circulating fluidized bed reactor may have a bottom section 214 and a mixing pot section 216 of the vessel that are cylindrical in shape. The mixing pot section 216 then comes up to a necking portion 218 of the vessel that is smaller in diameter than the mixing pot section 216. The necking portion 218 then goes to a top riser section 220, which includes the reactor output of the first stage. In an embodiment, the cylindrical shaped bottom section 214 of the vessel to the necking portion 218 forms a mixing pot section 216 with circumference and/or width dimensions that are substantially greater than the circumference of the riser section 220. The bottom section 214 has the sparger to distribute high-temperature and high-pressure steam in the circulating fluidized bed reactor. The sparger is located at or near the bottom of the vessel. The high-temperature and high-pressure steam from the sparger may supply some of the energy needed to decompose the biomass as well as create an upward force to carry the biomass and circulating heat-absorbing media up through the vessel.

In an embodiment, the sparger cooperates with an associated bubble breaker, such as cross hatched metal, to make smaller bubbles of gas to better carry the solids of the circulating media and biomass upward. The bubble breakers also prevent slugging and provide smoother circulation.

The one or more biomass inputs supply the biomass supply biomass chunks and/or particles at a higher pressure than in the vessel in order to distribute the biomass downward and across the vessel. The higher injection pressure and gravity cause the biomass chunks to be injected in the vessel. As a counter force, the steam from the sparger, superheated fluidization gases (steam, $N_2$, Argon), and a stream of the heat-absorbing media from the one or more media inputs both gasify and push up falling chunks and particles of the biomass upward and in a radial direction in the vessel. The velocity of the steam, media, and gases as well as the pressure pushes up the falling chunks and particles of biomass upward into the circulating fluidized bed reactor vessel. Using the latent heat provided by the steam, media, and gases, the biomass is converted to syngas by a decomposition reaction with steam as the chunks or particles of biomass rise in the circulating fluidized bed gasifier. The high temperature and high-pressure of the steam and the heat-absorbing media starts the devolatizing of the biomass, which causes localized turbulent flow of gases around each biomass chunk. The turbulent flow of gases creates better mixing and better reaction with the injected biomass.

The circulating fluidized bed may have different velocities flowing through the vessel, which also causes a good amount of turbulence for the biomass flowing with the circulating solid media. The velocity of the biomass flowing increases as the size of the chunk of biomass decreases via the decomposition of its larger complex molecules into smaller solid molecules and gaseous molecules. The devolatilization and decomposition of the biomass substantially increases the gas volume and therefore gas velocity of the system.

In an embodiment, the velocity flow of the biomass and/or heat-absorbing media in the bottom section 216 is 2-3 feet/second. The velocity flow of the biomass and/or heat-absorbing media in the mixing pot section 216 is between 2-6 feet/second in the circulating fluidized bed reactor based on a shape and dimensions of the vessel. The velocity flow of the biomass and its devotalized gases and solids at a start of the necking transition section is up to 5-10 feet per second based on the shape and dimensions of the vessel in this section. The velocity flow of the biomass and its devotalized gases and solids at the start of the necking transition section may be, for example, 6 feet per second. The velocity flow of the biomass and its devotalized gases and solids within the riser section 220 speeds up to 10-20 feet per second. The velocity flow of the biomass and its devotalized gases and solids at an exit of the riser section 220 is greater than 15 feet per second, and typically 20 feet per second, based on the shape and dimensions of the vessel in this section.

The velocity flows in the riser section 220 have a residence time of 1-2 seconds do to a rate of the velocity flow of the biomass and its devotalized gases and solids, and the heat-absorbing media; and, the designed dimensions and shape of the riser section 220. The lower velocities and bigger volume of the mixing pot section 216 allow for an on average residence time of 2-3 seconds within the mixing pot section 216 due to a rate of the velocity flow of the biomass and its devotalized gases and solids, and the heat-absorbing media; and, the designed dimensions and shape of the mixing pot section 216. This residence time is significantly longer than prior techniques. The longer residence time creates better mixing of the chunks of biomass with the circulating media to chemically react and decompose the biomass into its constituent solids and gases. Additionally, some chemical reactions need a longer chemical reaction time to assist in the prevention of forming of certain tars. Also, the longer residence time assists in increasing the yield of fully converting the woody biomass into its constituent solids, such as C (ash), and gases such as CO, $CO_2$, $CH_4$, and $H_2$.

The angular necking section 218 of the circulating fluidized bed reactor reflects and turns some of the heat-absorbing media, gases, and not fully-decomposed solid biomass on outside edges of the necking section 218 back down into the circulating fluidized bed in the mixing pot section 216, which causes more turbulence as well as a better distribution of the biomass inside the vessel. Note, an angle of the necking section 218 from the mixing pot section 216 to the riser section 220 controls an amount of turbulence with the reflected back heat-absorbing media, gases, and not fully decomposed solid biomass into the mixing pot section 216 portion of the vessel. The more turbulence the better the mixing of the heat-absorbing media and biomass, as well as a better distribution of the biomass throughout all of the circulating media in the lower portions of the circulating fluidized bed reactor vessel. The ratio of circulating media to biomass feed will be, for example, on the order of 20:1 up to 60:1 depending on operating objectives (desired reaction temperature, product slate, type and moisture content of biomass, temperature of incoming sand or olivine, etc.).

Note, example different shapes and angles of the vessel of the reactor are shown in FIGS. 2 and 3. The shown shapes and angles of the CFB reactor in FIGS. 2 and 3 are examples of the types of shapes and angles associated with portions of the vessel.

As discussed, the circulating fluidized bed reformer may have lower velocities at the bottom section 214 of the reactor, near the feed inlet, provided primarily by steam (and perhaps supplemental recycled syngas or $CO_2$) and will quickly rise as the woody biomass reacts and/or changes are made to the reactor diameter. The circulating fluidized bed reformer also may or may not contain internals intended to help with smoother fluidization and better mixing of the incoming sand or olivine and biomass. In an embodiment, an internal portion of the vessel does have the one or more internal mixing baffles to assist with mixing of the heat-absorbing media and biomass. Note, in the bubbling fluid bed version of the combustor internal mixing baffles may also be used.

As discussed, the circulating fluidized bed reactor has multiple sections forming a shape and an operation of the circulating fluidized bed reactor. The circulating fluidized bed gasifier has the sparger to distribute high-temperature and high-pressure steam in a bottom section 214 of the circulating fluidized bed reactor. The circulating fluidized bed reactor is configured to operate in a temperature regime from 750 degrees C. to 1000 C and an operating pressure is configured to be from 20 pounds per square inch up to 300 pounds per square inch with a typical value of 125 pounds per square inch. The steam and heated heat-absorbing media create this operating temperature in the vessel, which can also be supplemented with an external heat source such as a gas-fired burner coupled to the vessel. The reason for the ranges of the operating conditions for the circulating fluidized bed reactor are biomass type, ash fusion temperature, yield patterns, and downstream performance requirements.

In another example embodiment, the superficial gas velocities in a top riser section 220 are configured to be greater than 19 feet/second based on a shape and dimensions in this section of the vessel while the velocities in a mixing pot section 216 will range from 2-6 feet/second based on a shape and dimensions in this section of the vessel. The mixing pot section 216 is located between the bottom section 214 and top riser section 220. The steam from any of 1) the sparger, 2) the media inputs for the heat-absorbing media, and 3) the biomass inputs for the biomass combine to reform the biomass at total steam to biomass ratio ranging from 0.25:1 up to 1:1. The actual value will depend upon the biomass, its moisture content and operating objectives (yields, etc.). The steam and hot solid media reform the biomass in the circulating fluidized bed gasifier.

In the riser section 220, raw syngas including tars and methane, unreacted portions of solid biomass, ash from reacted portions of the biomass, and circulating media exit the riser section 220 of the circulating fluidized bed reactor.

The primary cyclone is coupled to the reactor output from the first stage in a riser section 220 of the circulating fluidized bed reactor. The top necking portion 218 of the circulating fluidized bed feeds into a top riser section 220 that then feeds into a primary cyclone that is very efficient, 99.99% efficiency at removing solid particles and pieces from the syngas. The primary cyclone is heavily loaded to operate at very high solids recovery efficiency in excess of 99%, and in most cases greater than 99.9%. In an embodiment, the cyclone has an efficiency 99.995%. The primary cyclone that is very efficient in separating solid particles including char and the solid circulating heat-absorbing media routes the solid particles toward the char combustor. The primary cyclone also routes gases from the stream of the reaction products toward the input of the second stage of the bio-reforming reactor. Thus, the output of the top portion of the primary cyclone is raw syngas that is fed to the second stage. The output of the bottom portion of the primary cyclone is solid particles and pieces fed to the char combustor. Gravity pulls the solid particles and pieces, including heat-absorbing media, ash, char, and other solids, down from the bottom of the primary cyclone through a loop seal into the char combustor.

Note, the char of the biomass, ash, and media (sand or olivine) stream is fed to the bubbling fluidized bed char combustor in order to regenerate and reheat the fluidization media.

Note, another type of combustor such as a circulating fluidized bed char combustor may be used. Also, another type of reactor may be used in the first stage such as a bubbling fluidized bed reactor, a radiant thermal reactor, a circulating fluidized bed reformer with a straight riser, or a fast-fluidized bed with a riser on top. Note, in an embodiment olivine is used as at least a portion of the heat-absorbing media. The olivine material (specifically the Magnesium Oxide (MgO) in olivine) as heat-absorbing media is for beneficial binding potassium out of the reaction products and minimizing clinker formation.

Note, tail/waste gases from other parts of the integrated plant, including methane from a downstream methanol stage if used, may be routed in a loop to the char combustor and used as supplemental fuel in the combustor to heat the heat-absorbing media. The char and fuel gases are combusted to heat the heat-absorbing media. Natural gas may be used as supplemental fuel in the combustor to provide the balance of gasification heat required. The combustor is operated at gas velocities that allow the smaller/lighter ash particles to be separated from the sand or olivine and recovered in flue gas solids removal systems (downstream of the recycle combustor cyclone). Hot, regenerated sand or olivine is returned to the gasifier/circulating fluidized bed reactor via an L-valve.

In an embodiment of the circulating fluidized bed version of the combustor, a recycle cyclone is coupled to the char combustor and is configured to operate at less than maximal efficiency from as low as 75% and no higher than 99%. This is to ensure that a bulk of the heat-absorbing media is returned to the char combustor but will allow the lighter ash particles to escape to the recycle cyclone where the ash particles are removed from the integrated plant. The recycle cyclone is the primary mode of exit for ash from the system (as well as attrited fines from the circulating media). The cyclone separator is a low efficiency cyclone separator that separates two solids such as the heavier circulation medium, such as sand or olivine, from the lighter particles of ash. In an embodiment of the bubbling fluidized bed version of the combustor, the cyclone will be extremely high efficiency—greater than 99.99%.

For the circulating fluid media loop with stage 1 of the BRR and the char combustor, the design may use properly designed devices such as L-valves and loop seals to ensure a desired circulation rate with safe operation.

The heat-absorbing circulating media could be silica-based sand, olivine, ilmenite, or mixtures thereof. The integrated plant may also put in other additives with the circulating media such as catalysts (to reduce the tar and other heavy hydrocarbon yield, increase approach to water-gas shift equilibrium, sulfur getters, and other additives to raise the melting points of the ash and media).

FIG. 5 illustrates a diagram of an embodiment of the circulating fluidized bed reactor having multiple sections that form a shape and an operation of the circulating fluidized bed reactor.

The circulating fluidized bed reactor has multiple sections 314-320 forming a shape and an operation of the circulating fluidized bed reactor. The circulating fluidized bed reactor may have a bottom section 314 and a mixing pot section 316 of the vessel that are cylindrical in shape. The mixing pot section 316 then comes up to a necking portion 318 of the vessel that is smaller in diameter than the mixing pot section 316. The necking portion 318 then goes to a top riser section 320, which includes the reactor output of the first stage, of the circulating fluidized bed reactor. The bottom section 314 has the sparger to distribute high-temperature and high-pressure steam in the circulating fluidized bed reactor. The sparger supplying steam is located at or near the bottom section 314 of the vessel.

The bottom section 314 of the vessel and the mixing pot section 316 of the vessel have width dimensions that are substantially greater than a circumference of the riser section 320. The circulating fluidized bed has different velocities flowing through the vessel in the multiple sections, which causes turbulence for the biomass flowing with the circulating solid media. The sparger at the section 314 of the vessel injects high-pressure steam at a velocity of about 2 feet/second and the high-pressure steam is between 50 to 300 pounds per square inch.

The biomass inputs to supply biomass are located in the mixing pot section 316 to feed the biomass toward the bottom of the vessel, where the biomass is mixed with superheated fluidization gases and heat-absorbing media. The feed point of the biomass inputs to supply biomass is far enough from the bottom section 314 of the vessel to ensure the biomass readily falls from the biomass inputs into the vessel from a great enough height that the biomass cannot get close to physically building up from the bottom to block the entering biomass; and thus, a location of the biomass inputs in the vessel eliminates a need to have a seal for the biomass inputs against solid biomass back flow. The design may have at least 3-foot drop on the gas feed line to taps/aeration points and also the gasifier/reactor and the char combustor plenums. This 3-foot rise is a very effective seal against solid back flow. This drop and rise varies with specific size and geometry of vessel.

The circulating fluidized bed reactor/biomass gasifier may be lined with refractory materials of both soft and hard refractory materials such as 2 inches of soft refractory insulation and 2 inches of hard refractory insulation. In an embodiment, the thickness of the hard face refractory insulation is adjusted to fit into nominal pipe and vessel size requirements. In another embodiment, what governs the refractory thickness and fit is the need to control temperature of the chosen metallurgy, erosion and chemical resistance of the refractory, etc.

FIG. 6 illustrates a diagram of an embodiment of a densely packed moving bed coupled to the reactor in the first stage via the primary cyclone.

The densely packed moving bed 435 may be made of olivine, ilmenite, or dolomite that is similar in composition to circulating heat-absorbing media. The densely packed moving bed 435 is configured to act as both a dust filter and a tar destroyer from the raw syngas stream coming out from the reactor output of the first stage. The densely packed moving bed 435 is coupled to a gaseous output of the primary cyclone coupled to the reactor output of the first stage. The tar destruction bed could operate adiabatically at 900 C (temperature could drop to 800-850 C) or isothermally with a mechanism for heating the bed—e.g. via a furnace or some oxygen addition. In an embodiment, the moving bed 435 is configured to operate adiabatically at 800 C to 950 C temperature. Tars heavier than benzene are chemically broken down into constituent gases in the raw syngas in the densely packed moving bed 435 in order to protect any downstream components from coating with soot.

In general, olivine is active for tar conversion at the decomposition and decomposition conditions present. Olivine is generally used in the gasifier as heat-absorbing media, due to its attrition resistance; however, it can also be applied separately downstream of the gasifier in the moving packed bed form as a guard bed/tar converter. Olivine performance for tar cracking activities can be very effective at these conditions. Regeneration of the Olivine packed moving bed 435 is accomplished by flowing the moving packed bed of Olivine with its collected dust and heavy tar residue into the packed bed of olivine and then into the char combustor to be joined and heated with the rest of the circulating olivine in the char combustor. In an embodiment, conversions—tars (heavier than benzene) may be 25-65%; benzene conversion may be 90%; light hydrocarbons conversion may be 0%; and methane conversion in the raw syngas may be 0%. Thus, the hot packed slow-moving bed 435 of olivine is operated at about 900 degrees C. to chemically break down the heavy sooting tars, such as polyaromatic hydrocarbons tars, in the raw syngas from the gasifier/reactor in the first stage. The hot packed slow-moving bed 435 of olivine, acts as a tar pre-reformer to substantially breaks down the heavy sooting tars to protect the downstream components from coating with soot.

Note, in order not to fluidize the moving bed, the apparent weight of the bed must exceed the pressure drop through the bed. Using an average olivine particle diameter of 550 microns, a GHSV (active bed length) of 3,000 v/v/hr, and an L/D of 0.385 ft/ft, a pressure drop of 4.1 pounds per square inch is estimated. Therefore, in an embodiment, a minimum densely packed bed level of seven feet (ft) is required above the outlet gas collector in order to keep the densely packed moving bed 435 from fluidizing.

In an embodiment, the moving bed may draw circulating media from the char combustor to act as the feed source for the densely packed bed and could be fed by a loop to the make-up insertion input into the moving bed.

In an embodiment, once the syngas has been processed to remove a substantial amount of heavy tars in the integrated plant, and then the syngas will be sent to the stage 2 system for destruction of the remaining tars and conversion of a substantial amount of the methane to synthesis gas in a catalytic reactor. This catalytic reactor may be packed with supported metal catalysts active for methane reforming and tar destruction. Typical metal catalysts include nickel oxide, precious metals, etc. as catalysts. In an embodiment, the catalytic reactor in the second stage may operate at 850-900 C and have multiple tubes, each with the catalyst inside the vessel of the reactor while gas fired heaters supply heat for the chemical reactions inside the tubes. The reactor may be co-fed with sufficient superheated steam to increase the steam:carbon ratio of the catalytic reactor feed to, for example, 8 mol/mol. The syngas with light tars and methane enters the tubes with the catalyst and then this reforms the light hydrocarbons in their constituent molecules of $H_2$, CO, $CO_2$, etc.

The catalytic reactor in the second stage may operate at GHSV's ranging from 1000-20,000 inverse hours, most preferably in the 2,000-7,000 range. The temperature of operation would be 700-1000 C, most likely in the 800-900 C range. The exact operating conditions would be a function of desired conversion, feed properties, and catalyst life. The tubular reactor system is installed in a fired furnace not unlike a Steam Methane Reformer furnace or ethylene furnace. The catalyst will require regeneration on some frequency to maintain activity. The regeneration is effected by mild oxidation of the carbon deposited on the catalyst, although steam or hydrogen regeneration in a reducing atmosphere can also be practiced.

The second stage of the BRR reduces the tars by cracking the tars out of the gas stream and does use a catalyst. The second stage reduces the methane percentage by steam-reforming the methane into smaller molecules such as CO, $CO_2$, and $H_2$. The resultant chemical grade synthesis gas will be substantially tar-free (less than 100 ppm total tars including benzene and naphthalene and more likely less than 5 ppm) with methane content as low as 2% (dry basis) and certainly no higher than 10%.

The output of the second stage is sent to a syngas cleanup section to remove additional trace contaminants from the syngas, such as sulfur, water, and potassium, and other trace contaminants before sending the chemical grade syngas to downstream chemical processes, selected from a methanol synthesis reactor, a Methanol to Gasoline reactor train process, a LTFT reactor train, or another chemical process that uses the reaction syngas product derived from biomass in the bio-reforming reactor.

In an embodiment, a tubular reactor with an operating temperature over 1100 degrees C. can substantially crack all of the tars and methane without a catalyst. A tubular reactor with lower operating temperatures can also crack these molecules with the assist of a catalyst.

As part of the plant integration, some of the raw syngas may bypass the Stage 2 catalytic reformer so as to maintain a high calorific value as use for fuel gas in the rest of the plant. This will especially be true for those cases requiring higher greenhouse gas reduction or for those where natural gas is not readily available at reasonable cost. This fuel gas could be used for generating steam, firing furnaces, supplemental fuel to the char combustor, and other places where natural gas might typically be used. Also, beneficial carbon credits may be generated for using this raw syngas from the integrated plant over natural gas.

Referring back to FIG. 3, the integrated plant may have a biomass feed supply system, an interconnected set of two or more stages of reactors 101, 103 to form a bio-reforming reactor, a gas clean up section, a steam methane reformer in parallel with bio-reforming reactor, and any of a methanol synthesis reactor, a Methanol to Gasoline reactor train process, a high temperature Fischer-Tropsch reactor train, or another chemical process that uses the reaction syngas product derived from the decomposition in the bio-reforming reactor and syngas from the steam methane reformer.

In the biomass feed supply system, the biomass may be stored as chips. The conveyor may bring the chips of biomass over to a filter/screen that make sure that the chip size is within limits, such as underneath 2 inches of length of chip of biomass. After the screening of the chip size, the biomass chips may be fed to a size reduction step such as a Hammermill. The Hammermill may then feed the chips to second screen to make sure that the chip size is within limits, such as underneath ¾ inches of length of chip of biomass. A conveyor may bring the chips through the second screen to either 1) a chip dryer or 2) to a biomass pre-treatment process to make smaller particles of biomass. The moist fine moist particles of biomass go to a dryer system and become biomass in a dried powered form. The dried powdered form of biomass may be stored in a silo. The biomass may be stored as chips.

The moisture content of the biomass can range from say 3-5% to as high as 35%. The integrated plant may have drying options that can include flash dryers, rotary drum dryers, or belt dryers. The integrated plant may dry in a low oxygen atmosphere for safety reasons including prevention of fires as well as inert gases from other parts of the process can be re-used and integrated as a supply into the dryers.

The biomass maybe fed to a lock hopper, where an entrainment feed gas system feeds the dried biomass into a circulating fluidized bed bioreactor. Alternatively, the chips of biomass in their slightly wet form also may go through a biomass chip dryer system and then be stored as half-inch to three-quarter inch chips of biomass in a silo tank. The chips of biomass are then fed through a conveyor to a chip lock hopper and feed system into the circulating fluidized bed bio reformer in the first stage 101.

The circulating fluidized bed bio reformer produces the raw syngas and other reaction products sent to the cyclone and moving bed in the outlet of the first stage 101. The gases from the first cyclone may be fed to one of three pathways. The first potential pathway is through a catalytic reactor second stage system 103. The second potential pathway is through a thermal reactor second stage system 103. The thermal second stage system that operates a higher temperature may be a radiant heat reactor. The pathway through the thermal reactor does not need to use a catalyst but rather operates at a higher temperature.

In any of the possible stage 2 reactors, the second stage reduces the methane percentage by steam-reforming the methane into smaller molecules such as CO, $CO_2$, and $H_2$. The second stage of the BRR reduces the tars by cracking the light tars and virtually all of the heavy tars out of the chemical grade syngas stream. The chemical grade syngas stream from the second stage is sent to a syngas cleanup section to remove additional contaminants from the syngas, such as sulfur, water, and potassium, and other contaminants before sending the chemical grade syngas to downstream chemical processes.

The integrated plant includes the multiple stage bio-reforming reactor that generates a chemical grade syngas that is supplied to a transportation fuel back-end such as gasoline or high temperature Fischer Tropsch fuel products. The integrated plant receives raw biomass such as pine wood and converts the biomass into the transportation fuel. The integrated plant may use diverse biomass feedstocks and feedstock preparation methods (including chip size and powder size). The integrated plant may have a flexible configuration to feed reaction products (of both natural gas and biomass, or biomass only fed into the bio-reforming reactor) to meet regional requirements and to maximize economics.

In an embodiment, the two or more stages, such as the 1st stage and 2nd stage, forming the bio-reforming reactor converts the solid biomass from the chunk or particle preparation step into gaseous reactants including $CH_4$, $H_2$, $CO_2$, and CO. The syngas produced by the bio-reforming reactor can be low in carbon dioxide because by design a substantially stoichiometric amount of steam is supplied into the reactor and no additional oxygen is supplied as a reactant or fuel to drive the reaction in the decomposition reaction. Thus, a very low amount of oxygen is present, and the decomposition reaction produces mainly CO rather than $CO_2$. The syngas from the biomass reforming reactor is also low in nitrogen, low in ammonia, low in sulfur content, and low in hydrogen cyanide (HCN). For example, the sulfur content of the syngas gas coming out of the bio-reforming reactor is barely over one part per million after the clean-up steps. In an embodiment, right out of the bio reforming reactor itself, the syngas stream could contain sulfur as high as 50 ppm; and the same is true for other constituents such as HCN, $NH_3$, etc. The woodchips used to produce the particles of biomass generally have a low sulfur content. Barely trace amounts of HCN, ammonia, are generated and trace amounts of nitrogen are present making the syngas virtually free of nitrogen, ammonia, and HCN, in the syngas stream coming out of the bio-reforming reactor. In contrast, syngas from coal contains high quantities of sulfur, amine, and HCN. Accordingly, the syngas cleanup components downstream of the bio-reforming reactor can be less inclusive and exclude some of the gas cleanup components needed for other biomass syngas producers, such as a coal-based syngas. Thus, compared to a coal-based syngas, an ammonia removal plant is not needed, a HCN removal plant is not needed, a nitrogen purge is not needed, and merely either the bulk sulfur removal or a sulfur guard bed is needed but not both. The lack of having to put multiple contaminant removal steps into the gas cleanup portion of the integrated plant reduces both capital expenses for constructing and installing in that equipment as well as reducing operating expenses for having to operate the additional gas removal equipment and replace their catalysts/filters to remove the contaminants from the syngas stream.

The syngas stream from the decomposition coming out of the bio-reforming reactor may have a 1.1:1 or a 1.2:1 hydrogen to carbon monoxide ratio. A ratio controller with sensors located at the input of the high temperature Fischer-Tropsch train will control the hydrogen to carbon monoxide ratio of syngas going into the Fischer-Tropsch train. The ratio will be about 1.5:1 to 2.0:1 hydrogen to carbon monoxide controlled by the controller and measured by hydrogen and carbon monoxide sensors at that input. In an embodiment, $H_2$:CO ratios of 1.8:1 to as high as 2.1:1 are in the syngas stream because of the steam in the process and the amount of water gas shift that goes on. The downside is that too much $CO_2$ may be made for the Fischer-Tropsch reactor train and some $CO_2$ removal may be inline or an additive may be added in the reactor process itself. However, the syngas to Methanol (MEOH) train does not mind $CO_2$ since it is a chemical reactant in this process. Sensors can also be located at the output of the bio-reforming reactor as well as the steam methane reforming reactor to have a ratio control system to know what the molarity of the syngas being supplied by each of these reactors is in order to know the proper volumes to mix to get the end result of having a combined syngas from the steam methane reforming reactor and the bio-reforming reactor between, for example, the range of 1.5:1 and 2.0:1. The ratio control system will also send feedback to both the bio-reforming reactor and the steam methane reforming reactor in order to control the volume of syngas being produced by both of those reactors.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

What is claimed is:

1. An integrated plant, comprising:
   an interconnected set of two or more stages of reactors forming a bio-reforming reactor configured to generate syngas for a low-temperature Fischer-Tropsch ("LTFT") reactor train, the syngas is derived from biomass fed to the bio-reforming reactor, where the biomass includes wood, where any fuel products produced by the low-temperature Fischer-Tropsch reactor train have a biogenic content of between 50% and 100%, wherein a first stage of the bio-reforming reactor includes a circulating fluidized bed reactor that has one or more media inputs to feed heat-absorbing media, a vessel to circulate the heat-absorbing media, and one or more biomass inputs to supply the biomass, wherein the first stage is configured to cause a set of chemical reactions in the biomass to produce reaction products of constituent gases, tars, chars, and other components, which exit through a reactor output from the first stage, wherein a second stage of the bio-reforming reactor has an input configured to receive a stream of some of the reaction products including the constituent gases and at least some of the tars as raw syngas, and then chemically reacts the raw syngas within a vessel of the second stage to yield a chemical grade syngas by further processing including cracking and/or reforming the 1) tars, 2) light hydrocarbons ($C_1$-$C_4$) or 3) both into constituent molecules, wherein the chemical grade syngas is mixed with a natural gas-derived syngas from a steam methane reformer to form a mixed syngas that is supplied to an input of the LTFT reactor train configured to produce LTFT fuel product, and wherein the integrated plant has a recirculation loop for recirculating at least $C_1$-$C_5$ products in purge gases and undesired reaction products from the LTFT reactor train back to either i) the steam methane reformer, ii) the input of the second stage of the bio-reforming reactor, or iii) both in order to aid in converting the biomass supplied to the first stage of the bio-reforming reactor into at least syncrude or other transportation fuels through the LTFT process using both the chemical grade syngas and a portion of the recirculated $C_1$-$C_5$ products.

2. The integrated plant of claim 1, further comprising:
at least one flash evaporator of the LTFT reactor train configured to separate a first stream of at least $H_2$, CO, and $C_1$-$C_5$ products from the LTFT process and a second stream of water-soluble alcohols from the LTFT process.

3. The integrated plant of claim 2, further comprising:
a first recycling loop for recycling at least a first portion of the first stream of $H_2$, CO, and $C_1$-$C_5$ products for use as fuel gas, where the second stage includes heaters for a tubular chemical reactor of the second stage to maintain an operating temperature of that reactor of at least 700 degree C, where a fuel gas mixing and distribution component is configured to receive fuel gas from the first recycling loop and supply that fuel gas to at least the heaters for the tubular chemical reactor, wherein an energy balance of the integrated plant is used for determining an amount of the first portion of the first stream of $H_2$, CO, and $C_1$-$C_5$ products from the LTFT process that is recycled for use as the fuel gas and a second portion of the first stream of $H_2$, CO, and $C_1$-$C_5$ products from the LTFT process that is recirculated in the recirculation loop back to the steam methane reformer and/or the second stage of the bio-reforming reactor for use as a chemical feedstock input to the LTFT process.

4. The integrated plant of claim 3, further comprising:
a second recycling loop for recycling the second stream of water-soluble alcohols from the LTFT process for use as the fuel gas, where the fuel gas mixing and distribution component couples to the second recycling loop for recycling water-soluble alcohols;

wherein the second stream of water-soluble alcohols is a part of the energy balance of the integrated plant used for determining the amount of the first portion of the first stream of $H_2$, CO, and $C_1$-$C_5$ products from the LTFT process that is recycled for use as the fuel gas and the amount of the second portion of the first stream of $H_2$, CO, and $C_1$-$C_5$ products from the LTFT process that is recirculated in the recirculation loop back to the steam methane reformer and/or the second stage of the bio-reforming reactor for the LTFT process.

5. The integrated plant of claim 4, further comprising:
a distillation unit configured to remove water from the second stream of water-soluble alcohols from the LTFT process to produce a distillate of about 75% by weight alcohols for use as the fuel gas.

6. The integrated plant of claim 3, further comprising:
a heavy hydrocarbon reactor train configured for upgrading Fischer-Tropsch products from the LTFT process, wherein the integrated plant is configured to fluidly connect the heavy hydrocarbon reactor train for upgrading Fischer-Tropsch products to the LTFT reactor train to supply a third stream of $C_{5+}$ products to the heavy hydrocarbon reactor train for upgrading Fischer-Tropsch products, and wherein the heavy hydrocarbon reactor train is configured for upgrading the Fischer-Tropsch products to provide commercial grade i) bio-gasoline, ii) bio-diesel, or iii) both as the transportation fuels that were derived from biomass including wood to have the biogenic content of between 50% and 100%.

7. The integrated plant of claim 6,
wherein the heavy hydrocarbon reactor train configured for upgrading Fischer-Tropsch products from the LTFT process includes a one-stage or two-stage hydrocracker with optional recycling of the $C_{5+}$ products, and wherein the hydrocracker is configured to use i) a stream of $H_2$ from the second portion of the first stream of $H_2$, CO, and $C_1$-$C_5$ products from the LTFT process before it is recirculated in the recirculation loop back to the steam methane reformer or the second stage of the bio-reforming reactor for the LTFT process, ii) a stream of $H_2$ from a pressure swing adsorption of the syngas from the interconnected set of two or more stages of reactors of the bio-reforming reactor configured, or iii) both.

8. The integrated plant of claim 7,
wherein the LTFT reactor train is also configured to use the stream of $H_2$ from the pressure swing adsorption of the syngas from the interconnected set of two or more stages of reactors of the bio-reforming reactor, the stream of $H_2$ is used for adjusting a ratio of the $H_2$ and CO in input to the LTFT reactor train for achieving a proper ratio for the LTFT process.

9. The integrated plant of claim 3,
wherein the at least one flash evaporator of the LTFT reactor train is further configured to separate $C_6$-$C_9$ products from the LTFT process, wherein the second portion of the first stream of $H_2$, CO, and $C_1$-$C_5$ products from the LTFT process further includes the $C_6$-$C_9$ products forming a fourth stream of at least $H_2$, CO, and $C_1$-$C_9$ products from the LTFT process, and wherein the fourth stream of $H_2$, CO, and $C_1$-$C_9$ products from the LTFT process is recirculated in the recirculation loop back to the steam methane reformer and/or the second stage of the bio-reforming reactor for the LTFT process to form $C_{10+}$products for the syncrude that is derived from biomass including wood to have the biogenic content of between 50% and 100%.

10. The integrated plant of claim 8, further comprising:

one or more control systems with one or more sensors configured to monitor a chemical composition feedback signal of the mixed syngas supplied to the LTFT reactor train to ensure a proper chemical composition and ratio of $H_2$ to CO is fed to the LTFT reactor train for the LTFT process.

11. A method for an integrated plant, comprising:

producing syngas for a low-temperature Fischer-Tropsch ("LTFT") process from biomass fed to a bio-reforming reactor of an interconnected set of two or more stages of reactors that form the bio-reforming reactor;

feeding biomass including wood to a circulating fluidized bed reactor of the first stage of the bio-reforming reactor through one or more biomass inputs of the circulating fluidized bed reactor;

feeding heat-absorbing media into the circulating fluidized bed reactor through one or more media inputs and circulating the heat-absorbing media in a vessel of the circulating fluidized bed reactor;

producing reaction products of constituent gases, tars, chars, and other components from a set of chemical reactions in the biomass in the first stage and subsequently sending the reaction products as raw syngas through a reactor output of the circulating fluidized bed reactor of the first stage;

receiving a stream of some of the raw syngas including the constituent gases and at least some of the tars through an input of the second stage of the bio-reforming reactor;

chemically reacting the raw syngas within a tubular reformer of the second stage to yield a chemical grade syngas by further cracking the tars, excess methane, or both into constituent molecules by further processing including cracking and/or reforming the 1) tars, 2) light hydrocarbons ($C_1$-$C_4$) or 3) both into constituent molecules;

mixing the chemical grade syngas with syngas derived from natural gas from a steam methane reformer in order to form a mixed syngas;

sending the mixed syngas to an input of a LTFT reactor train configured for a LTFT process; and recirculating at least $C_1$-$C_5$ products back to i) the steam methane reformer, ii) the second stage of the bio-reforming reactor, or iii) both from the LTFT reactor train through a recirculation loop to aid in converting the biomass supplied to the first stage of the bio-reforming reactor to syncrude or transportation fuels through the LTFT process, where any fuel products produced by the low-temperature Fischer-Tropsch reactor train have a biogenic content of between 50% and 100%.

12. The integrated plant of claim 11, further comprising:

separating a first stream of at least $H_2$, CO, and $C_1$$C_5$ products from the LTFT process and a second stream of water-soluble alcohols from the LTFT process with at least one flash evaporator of the LTFT reactor train.

13. The integrated plant of claim 12, further comprising:

recycling at least a first portion of the first stream of $H_2$, CO, and $C_1$-$C_5$ products for use as fuel gas with a first recycling loop; and determining the first portion of the first stream of $H_2$, CO, and $C_1$-$C_5$ products from the LTFT process to be recycled for use as the fuel gas and a second portion of the first stream of $H_2$, CO, and $C_1$-$C_5$ products from the LTFT process to be recirculated in the recirculation loop back to the steam methane reformer and/or the second stage of the bio-reforming reactor for the LTFT process, wherein the determining is in view of an energy balance of the integrated plant.

14. The integrated plant of claim 13, further comprising:

recycling the second stream of water-soluble alcohols from the LTFT process for use as the fuel gas with a second recycling loop, wherein the second stream of water-soluble alcohols is a part of the energy balance of the integrated plant used for determining an amount of the first portion of the first stream of $H_2$, CO, and $C_1$-$C_5$ products from the LTFT process that is recycled for use as the fuel gas and an amount of the second portion of the first stream of $H_2$, CO, and $C_1$-$C_5$ products from the LTFT process that is recirculated in the recirculation loop back to the steam methane reformer or the second stage of the bio-reforming reactor for the LTFT process.

15. The integrated plant of claim 14, further comprising:

removing water from the second stream of water-soluble alcohols from the LTFT process through a distillation unit configured to the remove water to produce a distillate of about 75% by weight alcohols for use as the fuel gas.

16. The integrated plant of claim 13, further comprising:

supplying a third stream of $C_{5+}$products to a reactor train configured for upgrading Fischer-Tropsch products; and upgrading the Fischer-Tropsch products from the LTFT process with the reactor train configured for the upgrading to provide bio-gasoline, bio-diesel, or both as the transportation fuels.

17. The integrated plant of claim 16, further comprising:

hydrocracking as part of upgrading the Fischer-Tropsch products from the LTFT process, the hydrocracking in a one- or two-stage hydrocracker with optional recycling of the $C_{5+}$products; and using in the hydrocracker i) a stream of $H_2$ from the second portion of the first stream of $H_2$, CO, and $C_1$-$C_5$ products from the LTFT process before it is recirculated in the recirculation loop back to the steam methane reformer or the second stage of the bio-reforming reactor for the LTFT process, ii) a stream of $H_2$ from pressure swing adsorption of the syngas from the interconnected set of two or more stages of reactors of the bio-reforming reactor configured, or iii) both.

18. The integrated plant of claim 17, further comprising:

using the stream of $H_2$ from the pressure swing adsorption of the syngas from the interconnected set of two or more stages of reactors of the bio-reforming reactor to adjust a ratio of the $H_2$ and CO in the LTFT reactor train for the LTFT process.

19. The integrated plant of claim 13, further comprising:
separating $C_6$-$C_9$ products from the LTFT process with at least one flash evaporator of the LTFT reactor train configured to separate the $C_6$-$C_9$ products from the LTFT process,
wherein the second portion of the first stream of $H_2$, CO, and $C_1$-$C_5$ products from the LTFT process further includes the $C_6$-$C_9$ products forming a fourth stream of at least $H_2$, CO, and $C_1$-$C_9$ products from the LTFT process; and
recirculating the fourth stream of $H_2$, CO, and $C_1$-$C_9$ products from the LTFT process in the recirculation loop back to the steam methane reformer or the second stage of the bio-reforming reactor for the LTFT process to form $C_{10+}$ products for the syncrude.

20. The integrated plant of claim 11, further comprising:
monitoring a chemical composition feedback signal of the mixed syngas supplied to the LTFT reactor train with one or more control systems including one or more sensors to ensure a proper chemical composition and ratio of $H_2$ to CO is fed to the LTFT reactor train for the LTFT process.

\* \* \* \* \*